US011927945B2

(12) United States Patent
Matsuzawa

(10) Patent No.: US 11,927,945 B2
(45) Date of Patent: Mar. 12, 2024

(54) APPARATUS FOR ASSISTING MAINTENANCE WORK, METHOD OF ASSISTING MAINTENANCE WORK, AND PROGRAM FOR ASSISTING MAINTENANCE WORK

(71) Applicant: DAIKIN INDUSTRIES, LTD., Osaka (JP)

(72) Inventor: Ryou Matsuzawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 121 days.

(21) Appl. No.: 17/439,973

(22) PCT Filed: Mar. 9, 2020

(86) PCT No.: PCT/JP2020/010024
§ 371 (c)(1),
(2) Date: Sep. 16, 2021

(87) PCT Pub. No.: WO2020/189374
PCT Pub. Date: Sep. 24, 2020

(65) Prior Publication Data
US 2022/0253050 A1 Aug. 11, 2022

(30) Foreign Application Priority Data
Mar. 19, 2019 (JP) .................................. 2019-052019

(51) Int. Cl.
G05B 23/02 (2006.01)
(52) U.S. Cl.
CPC ....... G05B 23/024 (2013.01); G05B 23/0221 (2013.01); G05B 23/0262 (2013.01); G05B 23/0283 (2013.01)

(58) Field of Classification Search
CPC .. G05B 2219/24001; G05B 2219/2614; G05B 2219/2638; G05B 23/0262; G05B 23/0283
See application file for complete search history.

(56) References Cited

U.S. PATENT DOCUMENTS 7,599,816 B2 10/2009 Kumamoto
10,621,545 B2 4/2020 Takigawa
(Continued)

FOREIGN PATENT DOCUMENTS

EP 2869153 5/2015
JP 2002-092206 3/2002
(Continued)

OTHER PUBLICATIONS

International Search Report dated Jun. 9, 2020, issued to PCT/JP2020/010024.
(Continued)

*Primary Examiner* — Mischita L Henson
(74) *Attorney, Agent, or Firm* — IPUSA, PLLC

(57) ABSTRACT

An apparatus for assisting maintenance work includes circuitry configured to perform learning based on a data set in association with a replaced or repaired part, or a new part after replacement indicated by work content information, and the learning includes processing an input of the data set or a portion of the data set, in accordance with model parameters of a machine learning model; determining work content information applied to the input; and updating the model parameters of the machine learning model based on the determined work content information.

17 Claims, 17 Drawing Sheets

(56) References Cited

U.S. PATENT DOCUMENTS

| | | | |
|---|---|---|---|
| 2003/0120972 A1 | 6/2003 | Matsushima et al. | |
| 2014/0195184 A1 | 7/2014 | Maeda et al. | |
| 2017/0212507 A1 | 7/2017 | Naito | |
| 2019/0258945 A1 | 8/2019 | Fukuda et al. | |
| 2020/0240662 A1* | 7/2020 | Picardi | G05B 23/0254 |
| 2021/0157312 A1* | 5/2021 | Cella | G05B 19/4184 |
| 2023/0236590 A1* | 7/2023 | Kamijima | G05B 23/0283 |
| | | | 702/184 |

FOREIGN PATENT DOCUMENTS

| | | |
|---|---|---|
| JP | 2003-172578 | 6/2003 |
| JP | 2003-316423 | 11/2003 |
| JP | 2004-265159 | 9/2004 |
| JP | 2013-069044 | 4/2013 |
| JP | 2013-114636 | 6/2013 |
| JP | 2017-130094 | 7/2017 |
| JP | 2018-142256 | 9/2018 |
| JP | 2019-144174 | 8/2019 |

OTHER PUBLICATIONS

International Preliminary Report on Patentability for PCT/JP2020/010024 dated Sep. 30, 2021.
Extended European Search Report for 20774298.2 dated Apr. 8, 2022.

* cited by examiner

FIG.2

| | | DEVICE OPERATION INFORMATION | | | | | | | | | | |
|---|---|---|---|---|---|---|---|---|---|---|---|---|
| TIME INFOR- MATION | ABNORMAL CODE or ANOMALY PREDICTION DATA | TOTAL OPERATING TIME LENGTH | OPERATION CONDITION | | | | | | | | | |
| | | | COM- PRESSOR SPEED | INLET SUPER- HEATING LEVEL | SUPER- COOLING LEVEL | DIS- CHARGING TEMPER- ATURE | VALUE INDI- CATING HIGH OR LOW PRESSURE | HIGH PRESSURE- SIDE TEMPER- ATURE | LOW PRESSURE- SIDE TEMPER- ATURE | VALVE OPENING | TEMPER- ATURE OF EXTERNAL HEAT EXCHANGER | ROOM TEMPER- ATURE | OUTSIDE TEMPER- ATURE |

(200, 2a)

| | DEVICE EVENT INFORMATION | |
|---|---|---|
| TIME OF OCCUR- RENCE | STATE | |
| | NOT COOLING / SHUTDOWN | HIGH ELECTRIC BILL | ... |

(210, 2b)

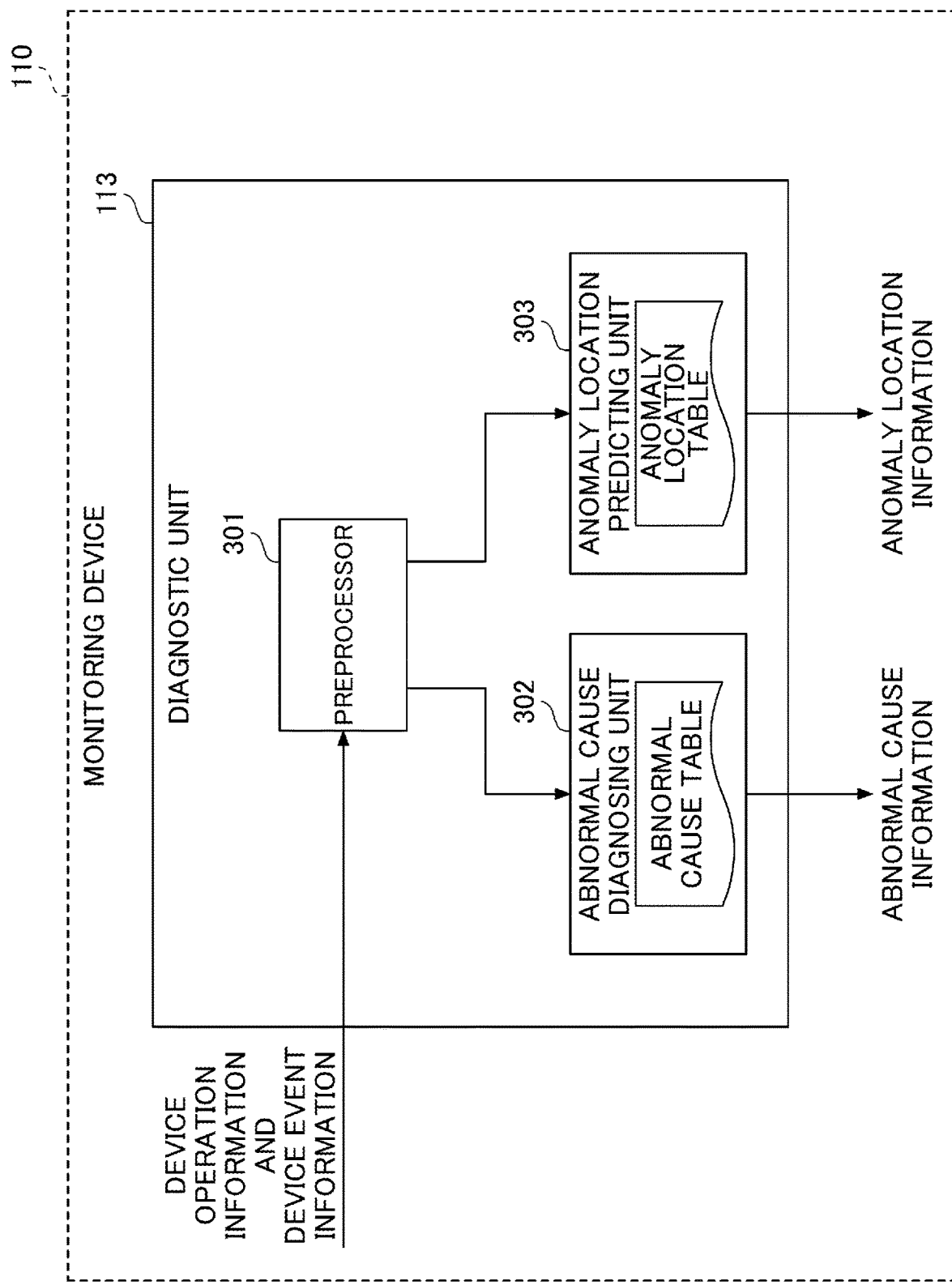

| DEVICE INFORMATION | | | | |
|---|---|---|---|---|
| DEVICE ID | DEVICE TYPE | DEVICE CAPACITY | POWER CONSUMPTION | YEARS SINCE INSTALLED (ELAPSED YEARS) |
| | | | | |

400

4b {

| DEVICE USER INFORMATION | | | | |
|---|---|---|---|---|
| BUILDING USAGE | THERMAL LOAD OF BUILDING | TOTAL FLOOR SPACE | BUILDING AGE | INDUSTRY CLASSIFI-CATION |
| | | | | |

410

4c {

| MAINTENANCE PROCEDURE INFORMATION | | |
|---|---|---|
| ABNORMAL CAUSE | ANOMALY LOCATION | MAINTENANCE PROCEDURE MANUAL |
| HIGH PRESSURE ANOMALY | OUTSIDE UNIT | MAINTENANCE PROCEDURE MANUAL 1 |
| | | |
| | | |
| | | |
| | | |
| | | |
| | | |

| WORKING DATE AND TIME | WORKING TIME LENGTH | OPERATOR | TARGET DEVICE ID | AB-NORMAL CAUSE | WORK CONTENT INFORMATION ||||| 600 |
| --- | --- | --- | --- | --- | --- | --- | --- | --- | --- | --- |
| | | | | | ANOMALY LOCATION | MAINTE-NANCE PROCEDURE MANUAL | PART BEFORE REPLACE-MENT | PART AFTER REPLACE-MENT | SITE SITUATION |
| | | | | | | | | | |
| | | | | | | | | | |
| | | | | | | | | | |

APPARATUS FOR ASSISTING MAINTENANCE WORK, METHOD OF ASSISTING MAINTENANCE WORK, AND PROGRAM FOR ASSISTING MAINTENANCE WORK

TECHNICAL FIELD

The disclosures herein relate to an apparatus for assisting maintenance work, a method of assisting maintenance work, and a program for assisting maintenance work.

BACKGROUND ART

Prediction techniques have been proposed to collect operation information or the like of air conditioners in operation to predict, upon occurrence of anomalies, anomaly locations based on diagnostic techniques that diagnose abnormal causes, anomaly codes, or the like that are output from the air conditioners. According to those techniques, when the anomalies occur, maintenance operators check the air conditioners based on the diagnosed abnormal causes or predicted anomaly locations, and identify faulty parts, thereby allowing for effectively performing maintenance work for replacing or repairing the faulty parts.

RELATED-ART DOCUMENTS

Patent Document

[Patent Document 1] Japanese Unexamined Patent Application Publication No. 2004-265159

SUMMARY OF THE INVENTION

Problem to be Solved by the Invention

However, at a time of an anomaly occurring, the maintenance operators, even if ascertaining a given abnormal cause or anomaly location, could not identify a fault part, unless they went to an actual target site. In view of the situation, the conventional diagnostic techniques and prediction techniques could not reduce the number of times a maintenance operator goes to a site.

The disclosures herein provide an apparatus for assisting maintenance work, a method of assisting maintenance work, and a program for assisting maintenance work that assists maintenance work while reducing the number of times a maintenance operator goes to a site.

Means to Solve the Problem

An apparatus for assisting maintenance work according to a first aspect of the present disclosure includes:
- a first acquirement unit configured to acquire a data set including a combination of device information of a target device and operation information of the target device, or a data set including a combination of the device information of the target device and event information indicating an event for the target device;
- a second acquirement unit configured to acquire work content information indicating a content of maintenance work, for the target device, set through a maintenance operator, the work content information indicating a replaced or repaired part, or a new part after replacement; and
- a learning unit configured to perform learning based on the data set acquired by the first acquirement unit, the data set being associated with the replaced or repaired part, or the new part after replacement that is indicated by the work content information acquired by the second acquirement unit.

In the first aspect of the present disclosure, a part of a target device to be replaced or repaired, or a new part after replacement can be identified prior to on-site services, and necessary preparation for replacement or repair prior to the on-site services can be made, thereby enabling reducing of the number of on-site services. In other words, according to the first aspect of the present disclosure, an apparatus for assisting maintenance work that assists maintenance work, while reducing the number of on-site services by a maintenance operator, can be provided.

An apparatus for assisting maintenance work according to a second aspect of the present disclosure includes:
- a first acquirement unit configured to acquire a data set including a combination of device information of a target device and operation information of the target device, or a data set including a combination of the device information of the target device and event information indicating an event for the target device;
- a second acquirement unit configured to acquire work content information indicating a content of maintenance work, for the target device, performed through a maintenance operator, the work content information indicating a work procedure; and
- a learning unit configured to perform learning based on the data set acquired by the first acquirement unit, the data set being associated with the work procedure indicated by the work content information that is acquired by the second acquirement unit.

In the second aspect of the present disclosure, a work procedure of maintenance work for a target device can be identified prior to on-site services, and necessary preparation for performing the work procedure prior to the on-site services can be made, thereby enabling reducing of the number of on-site services by a maintenance operator. In other words, according to the second aspect of the present disclosure, an apparatus for assisting maintenance work that assists maintenance work, while reducing the number of on-site services by a maintenance operator, can be provided.

An apparatus for assisting maintenance work according to a third aspect of the present disclosure includes:
- a calculation unit configured to calculate a reward based on feedback information for evaluating a work result of maintenance work for a target device; and
- a learning unit configured to learn, with respect to the target device, a part to be replaced or repaired, or a new part after replacement, based on a data set including a combination of device information of the target device and operation information of the target device, or a data set including a combination of the device information of the target device and event information indicating an event for the target device,
- wherein the learning unit is configured to learn, with respect to the target device, the part to be replaced or repaired, or the new part after replacement, based on the reward.

In the third aspect of the present disclosure, a part of a target device to be replaced or repaired, or a new part after replacement can be identified prior to on-site services, and necessary preparation for replacement or repair prior to the on-site services can be made, thereby enabling reducing of the number of on-site services. In other words, according to the third aspect of the present disclosure, an apparatus for assisting maintenance work that assists maintenance work, while reducing the number of on-site services by a maintenance operator, can be provided.

An apparatus for assisting maintenance work according to a fourth aspect of the present disclosure includes:
- a calculation unit configured to calculate a reward based on feedback information for evaluating a work result of maintenance work for a target device; and
- a learning unit configured to learn a work procedure of the maintenance work for the target device, based on a data set including a combination of device information of the target device and operation information of the target device, or a data set including a combination of the device information of the target device and event information indicating an event for the target device,
- wherein the learning unit is configured to learn a work procedure of the maintenance work for the target device, based on the reward.

In the fourth aspect of the present disclosure, a work procedure of maintenance work for a target device can be identified prior to on-site services, and necessary preparation for performing the work procedure prior to the on-site services can be made, thereby enabling reducing of the number of on-site services by a maintenance operator. In other words, according to the fourth aspect of the present disclosure, an apparatus for assisting maintenance work that assists maintenance work, while reducing the number of on-site services by a maintenance operator, can be provided.

A fifth aspect of the present disclosure is directed to an apparatus for assisting maintenance work according to any one of the first to fourth aspects, and a device information includes a type of the target device.

A sixth aspect of the present disclosure is directed to an apparatus for assisting maintenance work according to any one of the first to fourth aspects,
- wherein the operation information includes any one among an anomaly code, anomaly prediction data, an operation condition, room temperature, outside temperature, and a total operating time length, and each of the anomaly code and the anomaly prediction data is output from the target device.

A seventh aspect of the present disclosure is directed to an apparatus for assisting maintenance work according to the sixth aspect,
- wherein the target device is an air conditioner, and the operation condition includes any one among a compressor speed, an inlet overheat level, a supercooling level, a discharging temperature, a value indicating high or low pressure, a high pressure-side temperature, a low pressure-side temperature, valve opening, and a temperature of an external heat exchanger.

An eighth aspect of the present disclosure is directed to an apparatus for assisting maintenance work according to the first to fourth aspects,
- wherein the event information includes information indicating an event that occurs depending on a fault or an anomaly of the target device.

A ninth aspect of the present disclosure is directed to an apparatus for assisting maintenance work according to the first aspect, the apparatus for assisting maintenance work according further including:
- an inference unit configured to newly acquire a data set including a combination of device information of the target device and operation information of the target device, or a data set including a combination of the device information of the target device and event information indicating an event for the target device, to thereby infer, based on a result of learning by the learning unit, a part to be replaced or repaired, or a new part after replacement, with respect to the target device, from the newly acquired data set.

A tenth aspect of the present disclosure is directed to an apparatus for assisting maintenance work according to the second aspect, the apparatus for assisting maintenance work further including:
- an inference unit configured to newly acquire a data set including a combination of device information of the target device and operation information of the target device, or a data set including a combination of the device information of the target device and event information indicating an event for the target device, to thereby infer, based on a result of learning by the learning unit, a workflow of the maintenance procedure for the target device, from the newly acquired data set.

A method of assisting maintenance work according to an eleventh aspect of the present disclosure includes:
- a first acquirement step of acquiring a data set including a combination of device information of a target device and operation information of the target device, or a data set including a combination of the device information of the target device and event information indicating an event for the target device;
- a second acquirement step of acquiring work content information indicating a content of maintenance work, for the target device, performed through a maintenance operator, the work content information indicating a replaced or repaired part, or a new part after replacement; and
- a learning step of performing learning based on the data set acquired in the first acquirement step, the data set being associated with the replaced or repaired part, or the new part after replacement that is indicated by the work content information acquired in the second acquirement step.

In the eleventh aspect of the present disclosure, a part of a target device to be replaced or repaired, or a new part after replacement can be identified prior to on-site services, and necessary preparation for replacement or repair prior to the on-site services can be made, thereby enabling reducing of the number of on-site services. In other words, according to the eleventh aspect of the present disclosure, a method of assisting maintenance work that assists maintenance work, while reducing the number of on-site services by a maintenance operator, can be provided.

A method of assisting maintenance work according to a twelfth aspect of the present disclosure includes:
- a first acquirement step of acquiring a data set including a combination of device information of a target device and operation information of the target device, or a data set including a combination of the device information of the target device and event information indicating an event for the target device;
- a second acquirement step of acquiring work content information indicating a content of maintenance work, for the target device, performed through a maintenance operator, the work content information indicating a work procedure; and
- a learning step of performing learning based on the data set acquired in the first acquirement step, the data set being associated with the work procedure indicated by the work content information that is acquired in the second acquirement step.

In the twelfth aspect of the present disclosure, a work procedure of maintenance work for a target device can be identified prior to on-site services, and necessary preparation for performing the work procedure prior to the on-site services can be made, thereby enabling reducing of the number of on-site services by a maintenance operator. In other words, a method of assisting maintenance work that assists maintenance work, while reducing the number of on-site services by a maintenance operator, can be provided.

A method of assisting maintenance work according to a thirteenth aspect of the present disclosure includes:
 a calculation unit configured to calculate a reward based on feedback information for evaluating a work result of maintenance work for a target device; and
 a learning unit configured to learn, with respect to the target device, a part to be replaced or repaired, or a new part after replacement, based on a data set including a combination of device information of the target device and operation information of the target device, or a data set including a combination of the device information of the target device and event information indicating an event for the target device,
 wherein the learning unit is configured to learn, with respect to the target device, the part to be replaced or repaired, or the new part after replacement, based on the reward.

In the thirteenth aspect of the present disclosure, a part of a target device to be replaced or repaired, or a new part after replacement can be identified prior to on-site services, and necessary preparation for replacement or repair prior to the on-site services can be made, thereby enabling reducing of the number of on-site services. In other words, a method of assisting maintenance work that assists maintenance work, while reducing the number of on-site services by a maintenance operator, can be provided.

A method of assisting maintenance work according to a fourteenth aspect of the present disclosure includes:
 a calculation step of calculating a reward based on feedback information for evaluating a work result of maintenance work for a target device; and
 a learning step of learning a work procedure of the maintenance work for the target device, based on a data set including a combination of device information of the target device and operation information of the target device, or a data set including a combination of the device information of the target device and event information indicating an event for the target device,
 wherein the learning step includes learning a work procedure of the maintenance work for the target device, based on the reward.

In the fourteenth aspect of the present disclosure, a work procedure of maintenance work for a target device can be identified prior to on-site services, and necessary preparation for performing the work procedure prior to the on-site services can be made, thereby enabling reducing of the number of on-site services by a maintenance operator. In other words, a method of assisting maintenance work that assists maintenance work, while reducing the number of on-site services by a maintenance operator, can be provided.

In a fifteenth aspect of the present disclosure, a program for assisting maintenance work causes a computer to execute:
 a first acquirement step of acquiring a data set including a combination of device information of a target device and operation information of the target device, or a data set including a combination of the device information of the target device and event information indicating an event for the target device;
 a second acquirement step of acquiring work content information indicating a content of maintenance work, for the target device, performed through a maintenance operator, the work content information indicating a replaced or repaired part, or a new part after replacement; and
 a learning step of performing learning based on the data set acquired in the first acquirement step, the data set being associated with the replaced or repaired part, or the new part after replacement that is indicated by the work content information acquired in the second acquirement step.

In the fifteenth aspect of the present disclosure, a part of a target device to be replaced or repaired, or a new part after replacement can be identified prior to on-site services, and necessary preparation for replacement or repair prior to the on-site services can be made, thereby enabling reducing of the number of on-site services. In other words, a program for assisting maintenance work that assists maintenance work, while reducing the number of on-site services by a maintenance operator, can be provided.

In a sixteenth aspect of the present disclosure, a program for assisting maintenance work causes a computer to execute:
 a first acquirement step of acquiring a data set including a combination of device information of a target device and operation information of the target device, or a data set including a combination of the device information of the target device and event information indicating an event for the target device;
 a second acquirement step of acquiring work content information indicating a content of maintenance work, for the target device, performed through a maintenance operator, the work content information indicating a work procedure; and
 a learning step of performing learning based on the data set acquired in the first acquirement step, the data set being associated with the work procedure indicated by the work content information that is acquired in the second acquirement step.

In the sixteenth aspect of the present disclosure, a work procedure of maintenance work for a target device can be identified prior to on-site services, and necessary preparation for performing the work procedure prior to the on-site services can be made, thereby enabling reducing of the number of on-site services by a maintenance operator. In other words, according to the sixteenth aspect of the present disclosure, a program for assisting maintenance work that assists maintenance work, while reducing the number of on-site services by a maintenance operator, can be provided.

In a seventeenth aspect of the present disclosure, a program for assisting maintenance work causes a computer to execute:
 a calculation step of calculating a reward based on feedback information for evaluating a work result of maintenance work for a target device; and a learning step of learning, with respect to the target device, a part to be replaced or repaired, or a new part after replacement, based on
 a data set including a combination of device information of the target device and operation information of the target device, or a data set including a combination of the device information of the target device and event information indicating an event for the target device, wherein the learning step includes learning, with respect to the target device, the part to be replaced or repaired, or the new part after replacement, based on the reward.

In the seventeenth aspect of the present disclosure, a part of a target device to be replaced or repaired, or a new part after replacement can be identified prior to on-site services, and necessary preparation for replacement or repair prior to the on-site services can be made, thereby enabling reducing of the number of on-site services. In other words, according to the seventeenth aspect of the present disclosure, a program for assisting maintenance work that assists maintenance work, while reducing the number of on-site services by a maintenance operator, can be provided.

In an eighteenth aspect of the present disclosure, a program for assisting maintenance work causes a computer to execute:

a calculation step of calculating a reward based on feedback information for evaluating a work result of maintenance work for a target device; and a learning step of learning a work procedure of a maintenance procedure for the target device, based on a data set including a combination of device information of the target device and operation information of the target device, or a data set including a combination of the device information of the target device and event information indicating an event for the target device, wherein the learning step includes learning the work procedure of the maintenance work for the target device, based on the reward.

In the eighteenth aspect of the present disclosure, a work procedure of maintenance work for a target device can be identified prior to on-site services, and necessary preparation for performing the work procedure prior to the on-site services can be made, thereby enabling reducing of the number of on-site services by a maintenance operator. In other words, a program for assisting maintenance work that assists maintenance work, while reducing the number of on-site services by a maintenance operator, can be provided.

BRIEF DESCRIPTION OF DRAWINGS

FIG. 2 is a diagram illustrating an example of device operation information and device event information.

FIG. 3 is a diagram illustrating an example of a functional configuration of a diagnostic unit of a monitoring device.

FIG. 4 is a diagram illustrating an example of device information, device user information, and maintenance procedure information.

FIG. 6 is a diagram illustrating an example of work content information.

MODE FOR CARRYING OUT THE INVENTION

In the following, embodiments will be described with reference to the accompanying drawings. Note that in the specification and drawings, elements having substantially the same functions or configurations are denoted by the same numerals, and duplicate description thereof will be omitted.

First Embodiment

<System Configuration of System for Assisting Maintenance Work (Learning Phase)>

Figure 1:
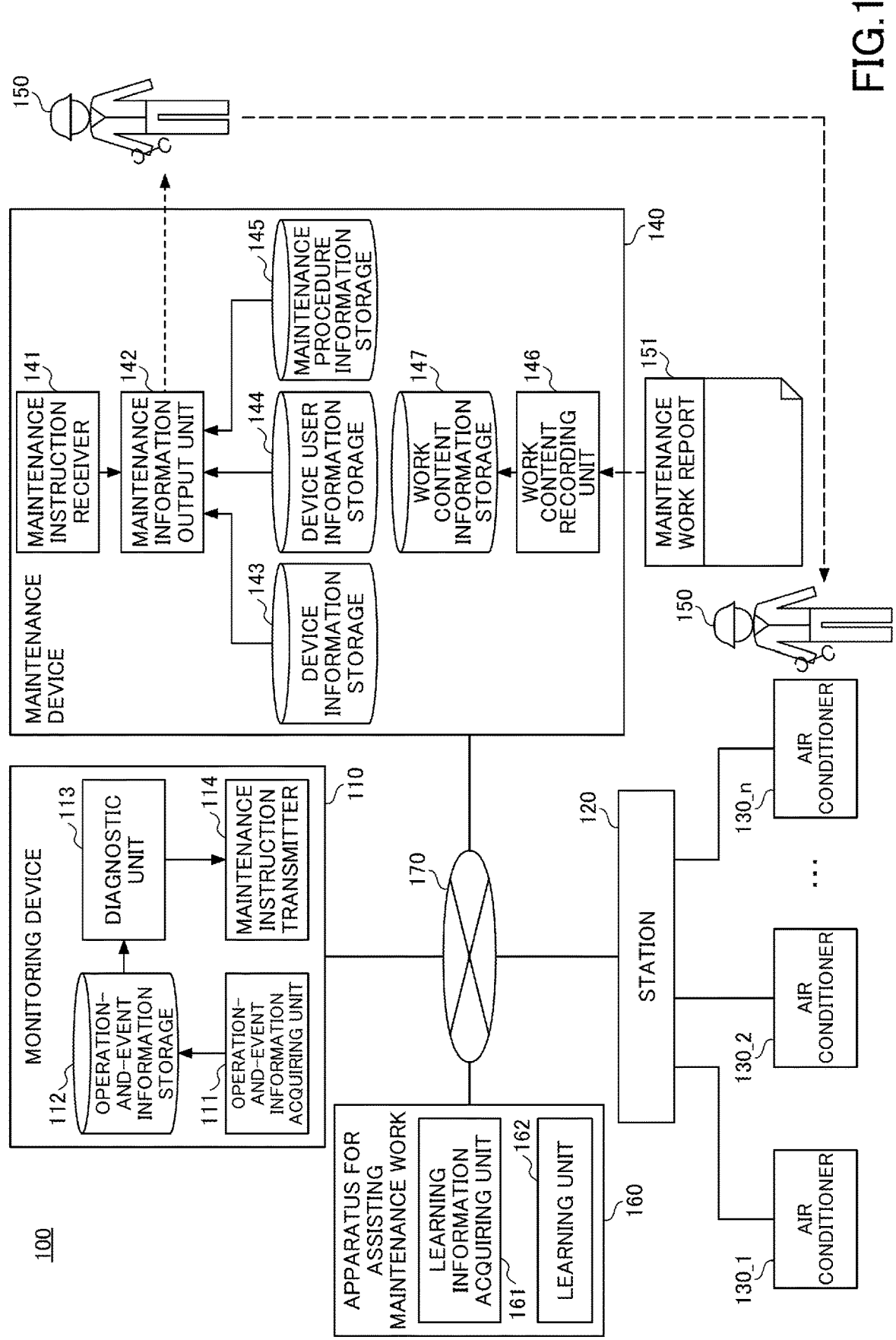
FIG. 1 is a diagram illustrating an example of a system configuration of a system for assisting maintenance work (learning phase).

The system configuration of a system for assisting maintenance work in a learning phase will be described. FIG. 1 is a diagram illustrating an example of the system configuration of the system for assisting maintenance work (learning phase). As illustrated in FIG. 1, for example, a system 100 for assisting maintenance work includes a monitoring device 110, a station 120, air conditioners 130_1 to 130_n, a maintenance device 140, and an apparatus 160 for assisting maintenance work. Note that in the system 100 for assisting maintenance work in the learning phase, the monitoring device 110, the station 120, the maintenance device 140, and the apparatus 160 for assisting maintenance work are coupled to one another via a network 170.

The monitoring device 110 is a device that monitors the air conditioners 130_1 to 130_n and transmits a maintenance instruction to the maintenance device 140 upon occurrence of an anomaly.

A monitoring program is installed in the monitoring device 110, and when the program is executed, the monitoring device 110 serves as an operation-and-event information acquiring unit 111, a diagnostic unit 113, and a maintenance instruction transmitter 114.

The operation-and-event information acquiring unit 111 acquires, at predetermined intervals, "device operation information" and "device event information", from the air conditioners 130_1 to 130_n and the like through the station 120, and stores the acquired information in an operation-and-event information storage 112.

The device operation information is information obtained by each of the air conditioner 130_1 to 130_n, regardless of operation or shutdowns. The device operation information includes an anomaly code or anomaly prediction data that a given air conditioner outputs when an anomaly occurs, and includes a total operating time length of the given air conditioner, operation information in operation (a compressor speed, an inlet overheat level, a supercooling level, or the like), room temperature, outside temperature, and the like. Note that the anomaly prediction data is data that is outputted upon occurrence of a condition in which given analysis software analyzes device operation information of a given air conditioner among the air conditioners 130_1 to 130_n, and then obtains an abnormal result of diagnosis.

The device event information is information indicating an event for a given air conditioner among the air conditioners 130_1 to 130_n. The device event information includes information indicating an event occurring in a given air conditioner among the air conditioners 130_1 to 130_n, as well as indicating the effect (such as "not cool," a "shutdown," or an "unusual noise"), of a failure or anomaly of the given air conditioner, among the air conditioners 130_1 to 130_n, on an indoor or outdoor environment.

When an anomaly code or anomaly prediction data is stored in the operation-and-event information storage 112, the diagnostic unit 113 diagnoses an abnormal cause based on other device operation information or device event information that is stored in the operation-and-event information storage 112. The diagnostic unit 113 indicates, to the maintenance instruction transmitter 114, information (abnormal cause information) indicating the diagnosed abnormal cause.

Alternatively, when an anomaly code or anomaly prediction data is stored in the operation-and-event information storage 112, the diagnostic unit 113 predicts an anomaly location by referring to a table that preliminarily specifies the relationship between either the anomaly code or the anomaly prediction data and the error location. The diagnostic unit 113 indicates, to the maintenance instruction transmitter 114, information (anomaly location information) indicating the predicted anomaly location.

When the diagnostic unit 113 indicates the abnormal cause information or anomaly location information, the maintenance instruction transmitter 114 transmits the abnormal cause information or anomaly location information to the maintenance device 140.

The station 120 is coupled to each of the air conditioners 130_1 to 130_n, and stores, in an internal memory, device operation information or device event information that is transmitted, at predetermined intervals (for example, 10 seconds), from each of the air conditioners 130_1 to 130_n. The station 120 also transmits the device operation information or the device event information stored in the internal memory to the monitoring device 110, at predetermined intervals (for example, every hour).

Each of the air conditioners 130_1 to 130_n is a device that removes pollution from the air in a given room in a building used by a user, and operates to automatically adjust temperature and humidity. Each of the air conditioners 130_1 to 130_n in operation acquires device operating information, and transmits it to the station 120. Also, each of the air conditioners 130_1 to 130_n in operation acquires the device event information, and transmits it to the station 120.

A maintenance program is installed in the maintenance device 140, and when the program is executed, the maintenance device 140 serves as a maintenance instruction receiver 141, a maintenance information output unit 142, and a work content recording unit 146.

The maintenance instruction receiver 141 receives the abnormal cause information or anomaly location information that is transmitted from the monitoring device 110. The maintenance instruction transmitter 114 indicates, to the maintenance information output unit 142, the received abnormal cause information or anomaly location information.

When the abnormal cause information or the anomaly location information is indicated, the maintenance information output unit 142 retrieves "device information" associated with a target air conditioner, from the device information storage 143. The device information is information indicating an attribute of a given air conditioner. The device information includes a device ID, a device type, device capacity, power consumption, years since installed, and the like.

Also, when the abnormal cause information or the anomaly location information is indicated, the maintenance information output unit 142 retrieves "device user information" associated with a user of a target air conditioner, from the device user information storage 144. The device user information is information about a building that is used by a user of a given air conditioner. The device user information includes building usage, thermal load for a building, a total floor space, building age, industry classification, and the like.

When the abnormal cause information or the anomaly location information is indicated, the maintenance information output unit 142 retrieves "maintenance procedure information" indicating a maintenance work procedure, from the maintenance procedure information storage 145. The maintenance procedure information is information indicating a specific procedure content for maintenance work. The maintenance procedure information is information that is classified for each abnormal cause and anomaly location.

The maintenance information output unit 142 presents, to a maintenance operator 150, the retrieved device information, device user information, and maintenance procedure information. In such a manner, the maintenance operator 150 recognizes that the anomalies occur in a given air conditioner, as well as recognizing at least one among an abnormal cause and an anomaly location. The maintenance operator 150 also recognizes the indicated information. In view of the recognition described above, the maintenance operator 150 would go to a site where a target air conditioner among the air conditioners 130_1 to 130_n is installed.

Note that the maintenance operator 150 checks a target air conditioner (in the example in FIG. 1, air conditioner 130_n) at a given site, based on a given abnormal cause or anomaly location, and then identifies a fault part to be replaced or repaired. Then, the maintenance operator 150 goes back to the site together with tools for replacing or repairing the identified part, or with a new part for replacement. Subsequently, the maintenance operator 150 stops an operating air conditioner 130_n, in order to repair the failure part or replace it with the new part. Upon completion of the replacement or repair operation for the part, the maintenance operator 150 restarts the air conditioner 130_n, and writes a content of a sequence of maintenance work in a maintenance work report 151. Note that the maintenance work report 151 written by the maintenance operator 150 is inputted into the maintenance device 140.

The work content recording unit 146 stores a maintenance work content of the maintenance work report 151 inputted by the maintenance operator 150, in a work content information storage 147.

The apparatus 160 for assisting maintenance work is an apparatus that operates in the learning phase. A program for assisting maintenance work (learning phase) is installed in the apparatus 160 for assisting maintenance work, and when the program is executed, the apparatus 160 for assisting maintenance work serves as a learning information acquiring unit 161 and a learning unit 162.

The learning information acquiring unit 161 is an example of each of a first acquirement unit and a second acquirement unit, and acquires learning information via the network 170. The learning information acquired by the learning information acquiring unit 161 includes:

- the device operation information and device event information that are stored in the operation-and-event information storage 112,
- the device information stored in the device information storage 143,
- the device user information stored in the device user information storage 144,
- the maintenance procedure information stored in the maintenance procedure information storage 145,
- the work content information and the like stored in the work content information storage 147, and the like.

The learning unit 162 performs machine learning with respect to a model that determines a part to be replaced or repaired, or a new part after replacement, based on the learning information acquired by the learning information acquiring unit 161. With this arrangement, the learning unit 162 generates a trained model that determines a part to be replaced or repaired, or a new part after replacement.

<Description of Device Operation Information and Device Event Information>

Hereafter, the device operation information and device event information that are stored in the operation-and-event information storage 112 will be described. FIG. 2 is a diagram illustrating an example of the device operation information and the device event information. The device operation information and device event information are stored separately for each air conditioner (for example, device operation information 200 indicates device operation information and device event information of an air conditioning apparatus 130_1).

As illustrated in 2a of FIG. 2, the device operation information 200 includes information items that are "time information", an "anomaly code or anomaly prediction data", a "total operating time length", a "operation condition", "room temperature", and "outside temperature." Further, the "operation condition" includes a "compressor speed", an "inlet superheating level", a "supercooling level", a "discharging temperature", a "value indicating high or low pressure", a "high pressure-side temperature", a "low pressure-side temperature", "valve opening", and a "temperature of external heat exchanger".

With respect to the device operation information 200, for the "time information", a time at which the air conditioner 130_1 acquires any one among the "anomaly code or anomaly prediction data" through the "outside temperature" is stored.

For the "anomaly code or anomaly prediction code" through the "outside temperature", contents obtained by the air conditioner 130_1 are respectively stored.

As illustrated in 2b of FIG. 2b, the device event information 210 includes information items that are "time of occurrence" and a "event." Furthermore, for the "event," an event occurring in a given air conditioner is indicated, as well as the effect ("not cooling", a "shutdown", and a "high electric bill") of an indoor environment, caused by a failure or anomaly of the given air conditioner.

For the "time of occurrence", a time at which any one of phenomena occurs is stored. For each of the conditions of "not cooling", "shutdown", and "high electric bill," information indicating that a corresponding event occurs is stored.

<Details of Functional Configuration of Diagnostic Unit of Monitoring Device>

Hereafter, the functional configuration of the diagnostic unit 113 among units included in the monitoring device 110 will be described in detail. FIG. 3 is a diagram illustrating an example of the functional configuration of the diagnostic unit of the monitoring device. As illustrated in FIG. 3, the diagnostic unit 113 includes a preprocessor 301, an abnormal cause diagnosing unit 302, and an anomaly location predicting unit 303.

The preprocessor 301 retrieves the device operation information and device event information, from the operation-and-event information storage 112. Further, the preprocessor 301 extracts, from the retrieved device operation information and device event information, information to be indicated to the abnormal cause diagnosing unit 302, and acquires a value obtained based on a portion of the extracted information, or a calculation result obtained by using a predetermined equation in which calculations are performed using the extracted information.

For example, the preprocessor 301 extracts, from the device operation information 200, an operation condition such as outdoor temperature, a discharging temperature, a high pressure-side temperature, or valve opening. The preprocessor 301 also acquires a time or the like that is obtained when a given operation condition or a given calculation result, which is obtained by performing calculations under the given condition, reaches a predetermined threshold. Further, for example, the preprocessor 301 extracts information indicating that an event indicative of "not cooling" occurs, from the device event information. Moreover, the preprocessor 301 indicates the extracted information or acquired information to the abnormal cause diagnosing unit 302.

Alternatively, the preprocessor 301 extracts, from the retrieved device operation information and device event information, information to be indicated to the anomaly location predicting unit 303, and then indicates the extracted information to the anomaly location predicting unit 303.

For example, the preprocessor 301 extracts an anomaly code or anomaly prediction data from the device operation information 200. The preprocessor 301 also indicates the extracted anomaly code or anomaly prediction data to the anomaly location predicting unit 303.

The abnormal cause diagnosing unit 302 inputs, into an abnormal cause table, the information indicated by the preprocessor 301 to output abnormal cause information. The abnormal cause table specifies abnormal causes that are a "gas defect", "gas leakage", "dirt of heat exchanger", "dirt of air filter", an "anomaly of discharging pipe", a "high pressure anomaly", and the like. A diagnostic condition for determining a given abnormal cause is specified.

The abnormal cause diagnosing unit 302 compares a given diagnostic condition specified in the abnormal cause table, against the information indicated by the preprocessor 301, determines whether any cause is applicable, and outputs abnormal cause information.

The anomaly location predicting unit 303 inputs, into an anomaly location table, the abnormal code or anomaly prediction data indicated by the preprocessor 301 to output anomaly location information. For each anomaly code or each anomaly prediction code, the anomaly location table specifies anomaly locations that are a "motor-operated valve", a "compressor", a "heat exchanger", a "coolant", a "solenoid valve", and the like. A confidence level is set for each anomaly location.

The anomaly location predicting unit 303 refers to the anomaly location table corresponding to a given anomaly code or anomaly prediction data, predicts an anomaly location at a high confidence level, and then outputs the anomaly location as anomaly location information.

<Description of Device Information, Device User Information, and Maintenance Procedure Information>

Hereafter, the device information stored in the device information storage 143, the device user information stored in the device user information storage 144, and maintenance procedure information stored in the maintenance procedure information storage 145 will be described.

FIG. 4 is a diagram illustrating an example of the device information, the device user information, and the maintenance procedure information. The device information is stored separately for each air conditioner, the device user information is stored separately for each building in which one or more air conditioners are installed, and the maintenance procedure information is stored separately for each type of air conditioner (for example, device information 400 indicates device information of the air conditioner 130_1).

As illustrated in 4a of FIG. 4, the device information 400 includes information items that are a "device ID", a "device type", "device capacity", "power consumption", and "years since installed (elapsed years)." The device information 400 is stored in the device information storage 143, when the air conditioner 130_1 is installed.

As illustrated in 4b of FIG. 4, the device user information 410 includes information items that are "building usage", a "thermal load of building", a "total floor space", "building age", and "industry classification." The device user information 410 is stored in the device user information storage 144, when each of the air conditioners 130_1 to 130_n is installed, for example.

As illustrated in 4c of FIG. 4, the maintenance procedure information 420 includes information items that are an "abnormal cause", an "anomaly location", and a "maintenance procedure manual". The maintenance procedure information 420 is information associated with the device type of the air conditioner 130_1, and a corresponding maintenance procedure manual is stored for each abnormal cause and for each anomaly location.

Note that the example in 4c of FIG. 4 is directed to a manner in which a "high pressure anomaly" is stored for the "abnormal cause", an "outside unit" is stored for the "anomaly location", and "maintenance procedure manual 1" is stored for the "maintenance procedure manual." In the example in 4c of FIG. 4, for the "anomaly location"="outside unit", only one maintenance procedure manual is illustrated, but in practice, it is assumed that many maintenance procedure manuals are stored.

<Specific Example of Maintenance Manual>

Figure 5:
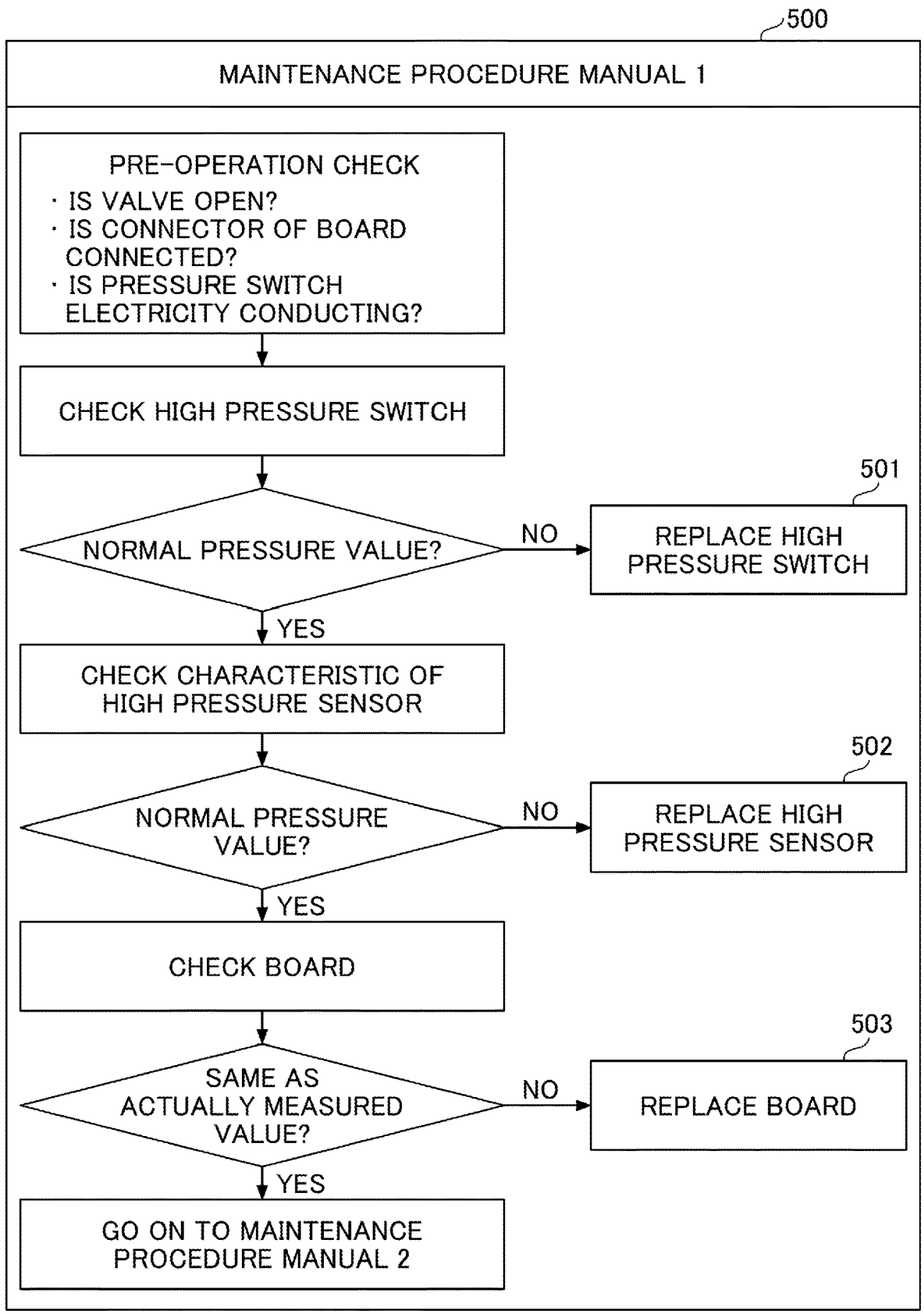
FIG. 5 is a diagram illustrating a specific example of a maintenance procedure manual.

Hereafter, a specific example of the maintenance procedure manual stored in the maintenance procedure information storage 145 will be described. FIG. 5 is a diagram illustrating the specific example of the maintenance procedure manual, and the "maintenance procedure manual 1" is illustrated. As described above, the maintenance procedure manual 1 is used when the abnormal cause is a high pressure anomaly, and the anomaly location is an outside unit.

The maintenance operator 150 works according to a workflow 500. In the workflow 500, a high pressure switch, a high pressure sensor, and a board are sequentially checked, and if is determined that, for example, an anomaly occurs in the high pressure switch, the high pressure switch is identified as a part to be replaced (see work step S01). Alternatively, if it is determined that an anomaly occurs in the high pressure sensor, the high pressure sensor is identified as a part to be replaced (see work step S02). Alternatively, if it is determined that an anomaly occurs in the board, the board is identified as a part to be replaced (see work step S03).

Note that if anomalies do not occur in any part, the maintenance operator 150 proceeds with a next maintenance procedure manual ("maintenance procedure manual 2"), and works according to a workflow specified in the maintenance procedure manual.

<Description of Work Information>

Hereafter, the work content information stored in the work content information storage 147 will be described. FIG. 6 is a diagram illustrating an example of the work content information. As illustrated in FIG. 6, the work content information 600 includes information items that are a "work date and time", a "working time length", an "operator", a "target device ID", an "abnormal cause", an "anomaly location", a "maintenance procedure manual", a "part before replacement", a "part after replacement", and a "site situation."

For the "work date and time", a date and time, on which the maintenance operator 150 has performed maintenance work at a site, is stored'. For the "working time length", a time length the maintenance operator 150 spent on maintenance work at a site is stored. For the "operator", an identifier for identifying an operator who has performed maintenance work on site is stored.

For the "target device ID", an identifier for identifying an air conditioner to be checked by the maintenance operator 150 who implements maintenance work on site is stored.

For the "abnormal cause", part information associated with an abnormal cause that has been identified by the maintenance operator 150 to actually inspect a given air conditioner provided at a site is stored. For the "anomaly location", part information associated with an anomaly location that has been identified by the maintenance operator 150 to actually inspect a given air conditioner provided at a site is stored.

For the "part before replacement", part information (part code) about a fault part that has been replaced or repaired by the maintenance operator 150 to actually inspect a given air conditioner provided at a site is stored. For the "part after replacement", information (part code) of a new part after replacement that has been replaced by the maintenance operator 150 is stored.

For the "maintenance procedure manual," information (e.g., maintenance procedure manual 1 or the like) for identifying a maintenance procedure manual that has been used by the maintenance operator 150 to identify a faulty part is stored.

For the "site situation", information about a site situation that the maintenance operator 150 has noticed is stored. For example, the information about the site situation refers to information indicating a situation not recognized from the device information or the device event information, such as a case in which unusual noise is generated by a given air conditioner, a case in which an object is placed near a given air conditioner, or a case in which an actually measured outside temperature at a site is higher than an outside temperature detected by a given air conditioner.

<Hardware Configuration of Apparatus for Assisting Maintenance Work>

In the following, the hardware configurations of the apparatuses constituting the system 100 for assisting maintenance work will be described. Note that in this description, as a representative example, the hardware configuration of the apparatus 160 for assisting maintenance work will be described.

Figure 7:
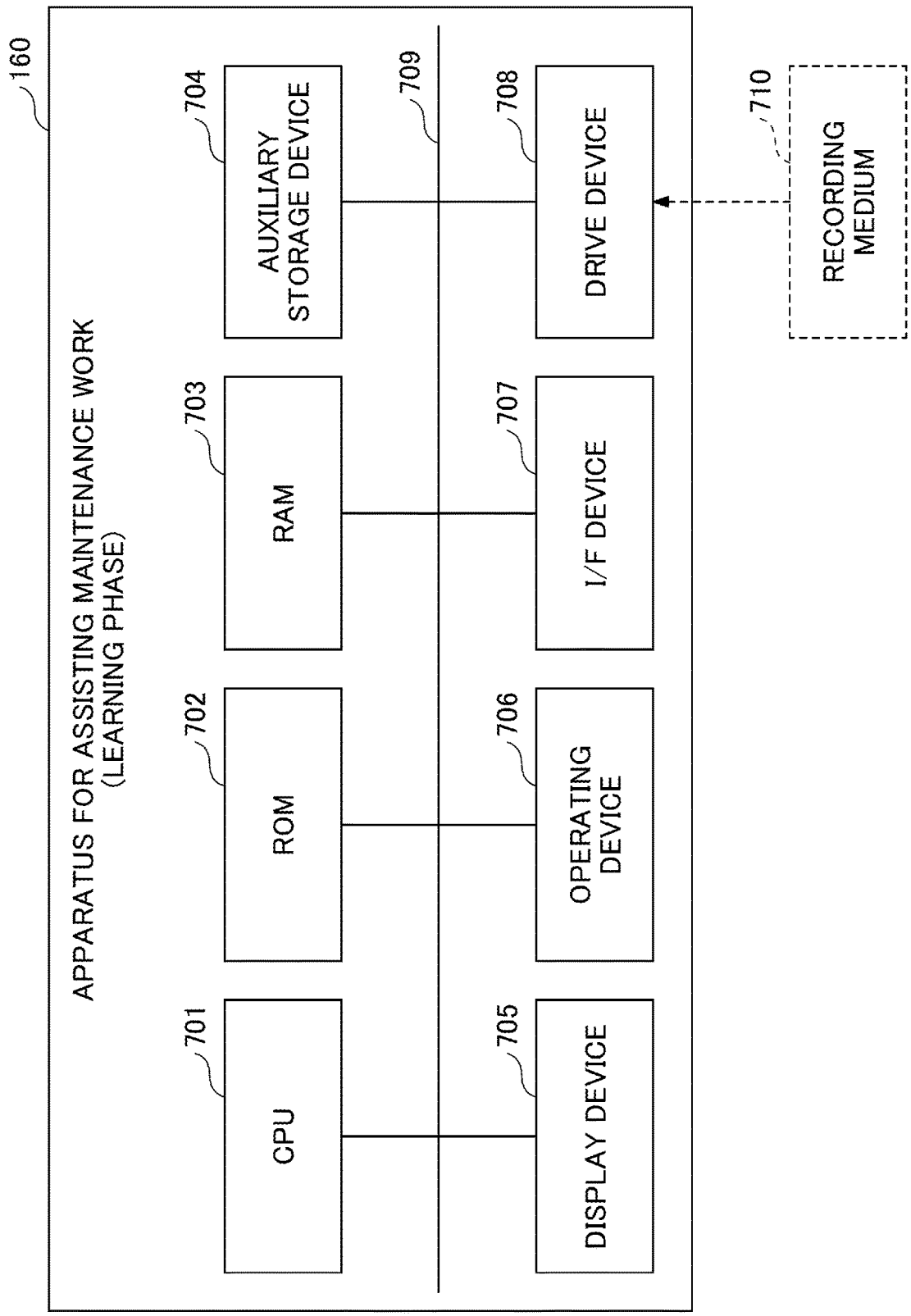
FIG. 7 is a diagram illustrating an example of a hardware configuration of the apparatus for assisting maintenance work.

FIG. 7 is a drawing illustrating an example of the hardware configuration of the apparatus for assisting maintenance work. As illustrated in FIG. 7, the apparatus 160 for assisting maintenance work includes a CPU (central processing unit) 701, a ROM (read only memory) 702, and a RAM (random access memory) 703. The CPU 701, the ROM 702, and the RAM 703 together constitute a computer. The apparatus 160 for assisting maintenance work further includes an auxiliary storage device 704, a display device 705, an operating device 706, an I/F (interface) device 707, and a drive device 708. The individual hardware parts of the apparatus 160 for assisting maintenance work are connected to one another through a bus 709.

The CPU 701 is an arithmetic device that executes various types of program (e.g., programs for assisting maintenance work (learning phase)) installed in the auxiliary storage device 704. The ROM 702 is a nonvolatile memory. The ROM 702, which functions as a main memory device, stores various types of program, data, and the like necessary for the CPU 701 to execute the various types of program installed in the auxiliary storage device 704. Specifically, the ROM 702 stores boot programs and the like such as BIOS (basic input/output system) and EFI (extensible firmware interface).

The RAM 703 is a volatile memory such as a DRAM (dynamic random access memory) and an SRAM (static random access memory). The RAM 703, which functions as a main memory device, provides a work area to which the various types of programs installed in the auxiliary storage device 704 are loaded when executed by the CPU 701.

The auxiliary storage device 704 stores various types of programs, and stores information used when the various types of program are executed.

The display device 705 is a display apparatus that displays an internal state of the apparatus 160 for assisting maintenance work. The operating device 706 is an operating apparatus that is used by an administrator of the apparatus 160 for assisting maintenance work, for example, to perform various types of operation with respect to the apparatus 160 for assisting maintenance work. The I/F device 707 is a communication device for performing communications through an access to the network 170.

The drive device 708 is a device to which a recording medium 710 is set. In this description, the recording medium 710 includes a medium for optically, electrically, or magnetically recording information, such as a CD-ROM, a flexible disk, a magneto-optical disk, or the like. The recording medium 710 may also include a semiconductor memory or the like that electrically records information, such as a ROM, a flash memory, or the like.

Note that the various types of programs to be installed in the auxiliary storage device 704 are installed by the drive device 708 reading the various types of programs recorded in the recording medium 710 upon the recording medium 710 being supplied and set in the drive device 708, for example. Alternatively, the various types of program to be installed in the auxiliary storage device 704 may be installed upon being downloaded from the network 170.

<Functional Configuration of Apparatus for Assisting Maintenance Work (Learning Phase)>

Figure 8:
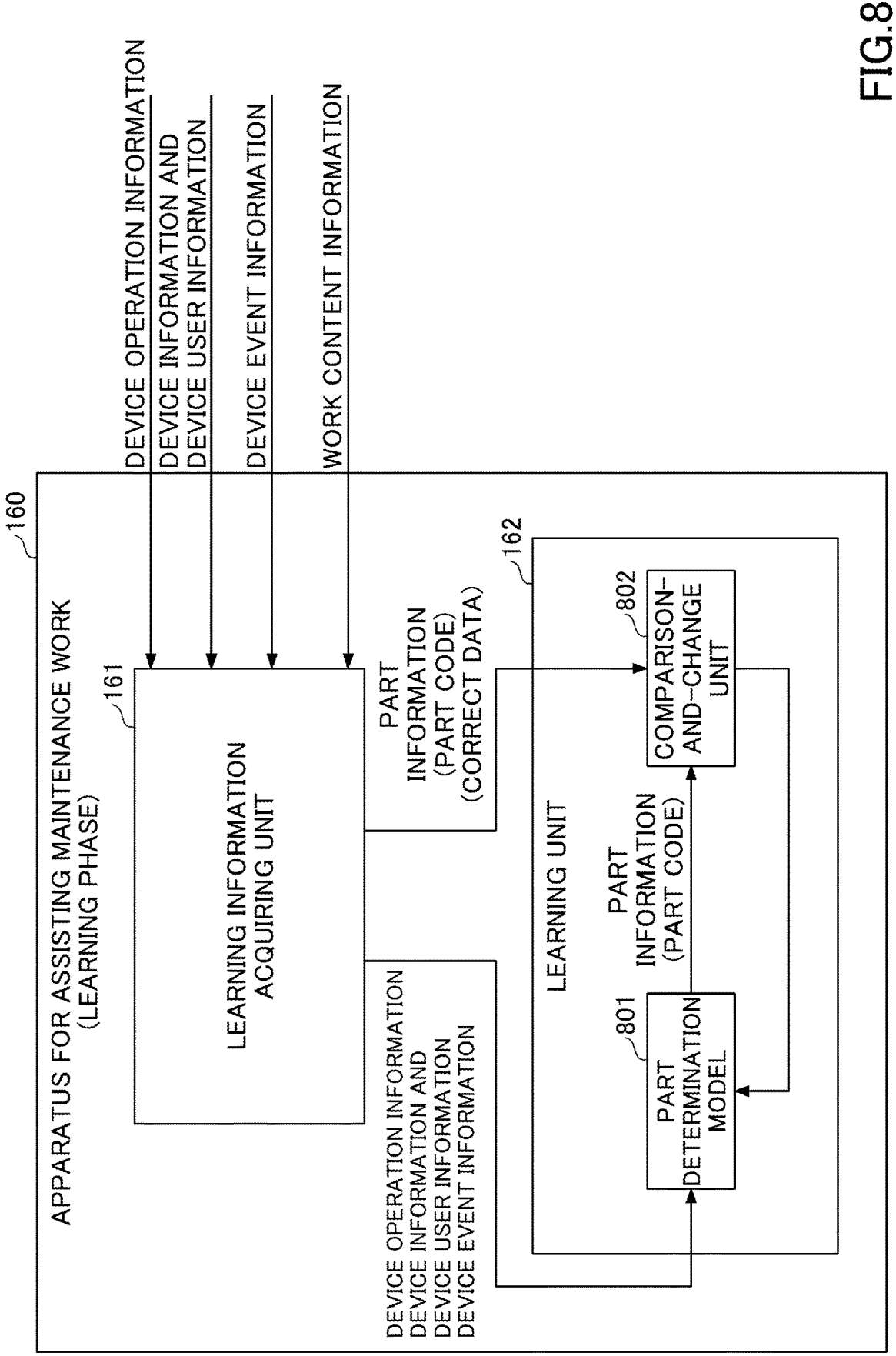
FIG. 8 is a diagram illustrating an example of the function of the apparatus for assisting maintenance work that is implemented in the learning phase according to a first embodiment.

Hereafter, the functional configuration of the apparatus 160 for assisting maintenance work in the learning phase will be described. FIG. 8 is a diagram illustrating an example of the function of the apparatus for assisting maintenance work that is implemented in the learning phase according to a first embodiment. As illustrated in FIG. 8, the apparatus 160 for assisting maintenance work includes a learning information acquiring unit 161 and a learning unit 162.

The learning information acquiring unit 161 acquires information (learning information) used when the learning unit 162 performs machine learning. Specifically, the learning information acquiring unit 161 acquires the device operation information and device event information, from the operation-and-event information storage 112 of the monitoring device 110. The learning information acquiring unit 161 respectively acquires the device information and device user information, from the device information storage 143 and the device user information storage 144 of the maintenance device 140. The learning information acquiring unit 161 also acquires the work content information, from the work content information storage 147 of the maintenance device 140. The learning information acquiring unit 161 further indicates, to the learning unit 162, the acquired learning information.

The learning unit 162 includes a part determination model 801 and a comparison-and-change unit 802. The learning unit 162 inputs, into the part determination model 801, the device operation information, the device event information, the device information, and the device user information, among the identified learning information, to thereby execute the part determination model 801. With this arrangement, the part determination model 801 outputs part information (part code).

The part information (part code) output from the part determination model 801 is input to the comparison-and-change unit 802. The comparison-and-change unit 802 compares the part information (part code) output from the part determination model 801, against the part information (part code) (correct data) indicated by the learning information acquiring unit 161.

The comparison-and-change unit 802 changes model parameters of the part determination model 801, based on a result of comparison. Note that the part information indicated by the learning information acquiring unit 161 indicates a fault part (part before replacement) that is replaced or repaired, or a new part (part after replacement) after replacement.

In the manner described above, for example, the learning unit 162 executes machine learning with respect to the part determination model 801 for identifying the relationship between:

device operation information, device event information, device information, and device user information (data set), and part information (part code).

With this arrangement, the learning unit 162 generates a trained part determination model for determining part information (part code).

Note that the example of FIG. 8 has been directed to a case in which the learning unit 162 inputs, into the part determination model 801, the device operation information, the device event information, the device information, and the device user information. Alternatively, only a portion of the information described above may be input into the part determination model 801.

For example, the learning unit 162 performs machine learning with respect to the part determination model 801 for identifying the relationship between:

device operation information and device information (data set), and part information (part code), or with respect to the part determination model 801 for identifying the relationship between:

device event information and device information (data set), and part information (part code).

With this arrangement, the learning unit 162 generates a trained part determination model for determining part information (part code).

<System Configuration of System for Assisting Maintenance Work (Inference Phase)>

Figure 9:
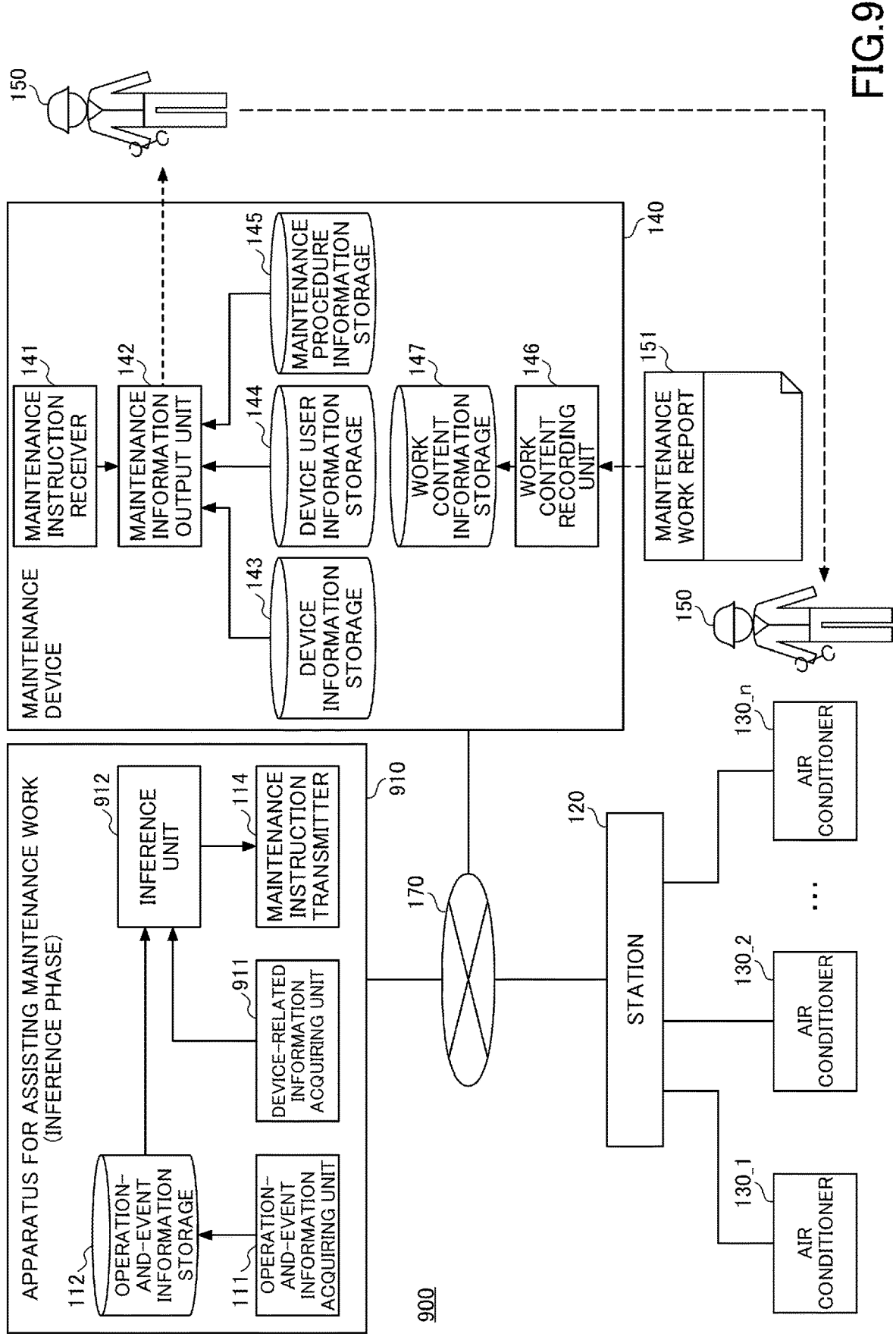
FIG. 9 is a diagram illustrating an example of a system configuration of the system for assisting maintenance work (inference phase).

Hereafter, the system configuration of the system for assisting maintenance work in the inference phase will be described. FIG. 9 is a diagram illustrating an example of the system configuration of the system for assisting maintenance work (inference phase). This differs from the system 100 for assisting maintenance work (FIG. 1) in the learning phase, in that the system 900 for assisting maintenance work in the inference phase does not include an apparatus 160 for assisting maintenance work in the learning phase. Also, in the system 900 for assisting maintenance work in the inference phase, an apparatus 910 for assisting maintenance work in the inference phase is included, instead of the monitoring device 110.

The apparatus 910 for assisting maintenance work is an apparatus that monitors the air conditioners 130_1 to 130_n, and transmits a maintenance instruction to the maintenance device 140 upon occurrence of an anomaly.

A program for assisting maintenance work (inference phase) is installed in the apparatus 910 for assisting maintenance work. When the program is executed, the apparatus 910 for assisting maintenance work serves as the operation-and-event information acquiring unit 111, a device-related information acquiring unit 911, an inference unit 912, and the maintenance instruction transmitter 114.

Note that because the operation-and-event information acquiring unit 111 and the maintenance instruction transmitter 114 have been described with reference to FIG. 1, the description thereof will be omitted.

The device-related information acquiring unit 911 acquires, from the maintenance device 140, information (device-related information) to be used when the inference unit 912 performs an inference process. Specifically, the device-related information acquiring unit 911 respectively acquires the device information and the device user information, from the device information storage 143 and the device user information storage 144 of the maintenance device 140. The device-related information acquiring unit 911 also indicates the acquired device-related information (device information and the device user information) to the inference unit 912.

The inference unit 912 includes a trained part determination model, and executes the trained part determination model to output part information (part code). The inference unit 912 inputs the device operation information and device event information stored in the operation-and-event information storage 112, and the device-related information (device information and device user information) indicated by the device-related information acquiring unit 911, to thereby execute the trained part model. Note that in the inference phase, the maintenance instruction transmitter 114 transmits the part information (part code) to the maintenance device 140.

<Details of Functional Configuration of Inference Part>

Figure 10:
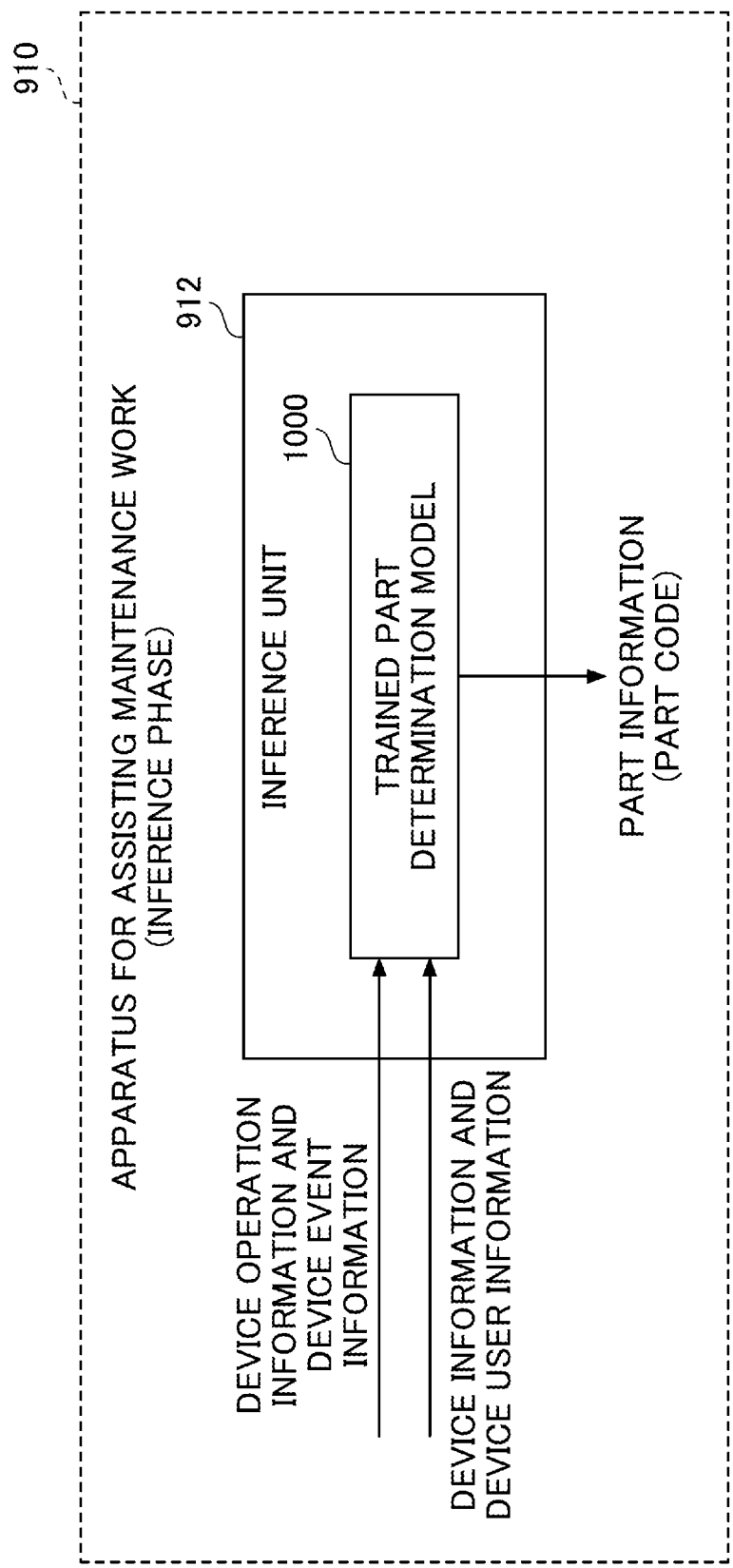
FIG. 10 is a first diagram illustrating the details of the functional configuration of an inference unit.

Hereafter, the functional configuration of the inference unit 912, among functional configurations of the apparatus 910 for assisting maintenance work in the inference phase, will be described in detail. FIG. 10 is a first diagram illustrating the details of the functional configuration of the inference unit. As illustrated in FIG. 10, the inference 912 includes a trained part determination model 1000.

The inference unit 912 retrieves device operation information and device event information, from the operation-and-event information storage 112 storing the operation information and device event information. Note that the device operation information and device event information retrieved by the inference unit 912 are respectively device operation information and device event information that are each different from corresponding information among the device operation information and device event information that are retrieved when the learning unit 162 performs machine learning.

The inference unit 912 also acquires the device information and the device user information indicated by the device-related information acquiring unit 911.

The inference unit 912 inputs, into the trained part determination model 1000, the retrieved device operation information and device event information, as well as the acquired device information and device user information, to thereby execute the trained part determination model 1000. With this arrangement, the trained part determination model 1000 infers part information (part code).

In the manner described above, the inference unit 912 infers the part information (part code) based on present device operation information and device event information, as well as the device information and device user information associated with a target air conditioner, thereby enabling inferring of appropriate part information (part code).

Note that the description provided above has been directed to a case in which the inference unit 912 inputs, into the trained part determination model 1000, the device operation information, the device event information, the device information, and the device user information. Alternatively, when the trained part determination model 1000 has been generated based on the device operation information and device information, the inference unit 912 inputs, into the trained part determination model 1000, the device operation information and device information. Also, when the trained part determination model 1000 has been generated based on the device event information and device information, the inference unit 912 inputs, into the trained part determination model 1000, the device event information and device information.

The part information (part code) inferred by the inference unit 912 is part information (part code) about a part to be replaced or repaired, or a new part after replacement.

<Flow of Process for Assisting Maintenance Work>

Figure 11:
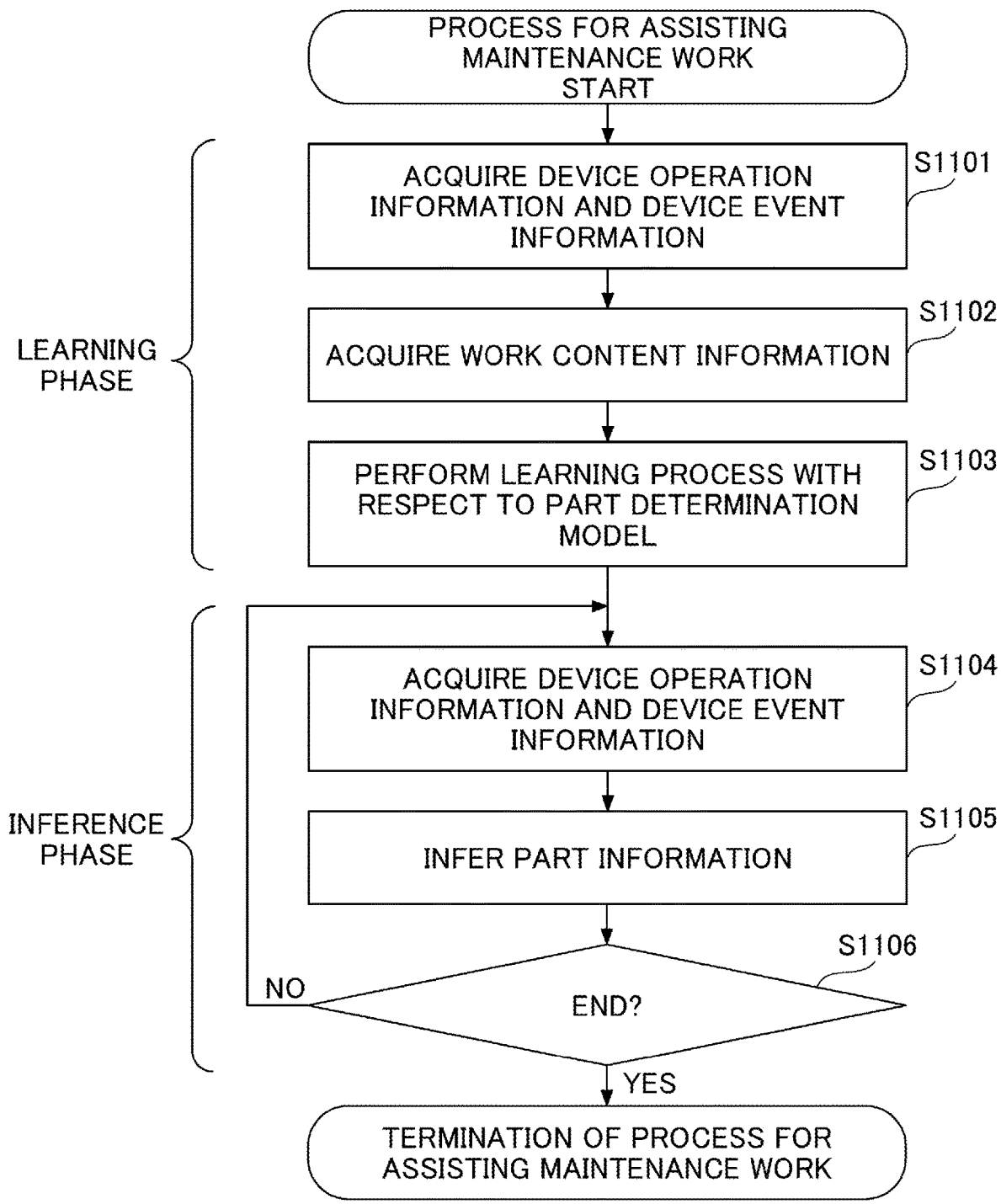
FIG. 11 is a flowchart illustrating the flow of a process of assisting maintenance work by apparatuses for assisting maintenance work according to the first embodiment.

Hereafter, the flow of a process of assisting maintenance work, by the apparatus 160 for assisting maintenance work in the learning phase and the apparatus 910 for assisting maintenance work in the inference phase, will be described. FIG. 11 is a flowchart illustrating the flow of the process for assisting maintenance work by apparatuses for assisting maintenance work according to the first embodiment.

In step S1101, the learning information acquiring unit 161 acquires the device operation information and the device event information.

In step S1102, the learning information acquiring unit 161 acquires the work content information.

In step S1103, the learning unit 162 inputs, into the part determination model 801, the device operation information and the device event information so as to execute the part determination model 801. The learning unit 162 performs machine learning with respect to the part determination model 801 such that the part information (part code) output from the part determination model 801 approaches the part information (part code) (correct data) included in the work content information that is acquired by the learning information acquiring unit 161. With this arrangement, the learning unit 162 generates a trained part determination model. Note that the trained part determination model generated is incorporated into the apparatus 910 for assisting maintenance work in the inference phase.

In step S1104, the inference unit 912 acquires the device operation information and device event information of an air conditioner that is a target device.

In step S1105, the inference unit 912 inputs the acquired device operation information and device event information into the trained part determination model 801 to execute the trained part determination model 801. With this arrangement, the inference unit 912 infers part information (part code).

In step S1106, the inference unit 912 determines whether to terminate the process for assisting maintenance work. If it is determined in step S1106 that the process for assisting maintenance work continues (NO in step S1106), the process returns to step S1104.

In contrast, if it is determined in step S1106 that the process for assisting maintenance work is terminated (YES in step S1106), the process for assisting maintenance work is terminated.

Note that FIG. 11 has been directed to a case in which the learning unit 162 performs batch learning that changes model parameters upon inputting the device operation information and device event information into the part determination model 801 in a batch. Alternatively, the learning unit 162 may perform sequential learning that changes model parameters upon inputting the device operation information and device event information into the part determination model 801 a predetermined number of bytes at a time.

[Summary]

As is understood from the description provided above, any one of the apparatuses for assisting maintenance work according to the first embodiment is configured to:

perform learning with respect to device operation information and device information (or, device event information and device information) associated with part information (part code); and infer, based on a result of learning, part information (part code) from newly acquired device operation information and device information (or, device event information and device information).

With this arrangement, according to the apparatuses for assisting maintenance work of the first embodiment, the part information (part code) indicating a fault part to be replaced or repaired, or a new part after replacement can be inferred upon occurrence of an anomaly.

In the manner described above, according to the first embodiment, the maintenance operator can identify part information (part code) prior to on-site services, and make necessary preparation for replacement or repair prior to the on-site services, thereby enabling reducing of the number of on-site services. In other words, according to the first embodiment, an apparatus for assisting maintenance work, a method of assisting maintenance support, and a program for assisting maintenance work that assists maintenance work, while reducing the number of on-site services by a maintenance operator, can be provided.

Second Embodiment

The first embodiment has been directed to a case in which machine learning is performed by using the part information (part code) as correct data. In contrast, in a second embodiment, a case in which machine learning is performed by using, as correct data, the maintenance procedure manual information among the work content information will be described. In the following, the second embodiment will be described with a focus on the differences from the first embodiment.

<Functional Configuration of Maintenance Work Assist Apparatus (Learning Phase)>

Figure 12:
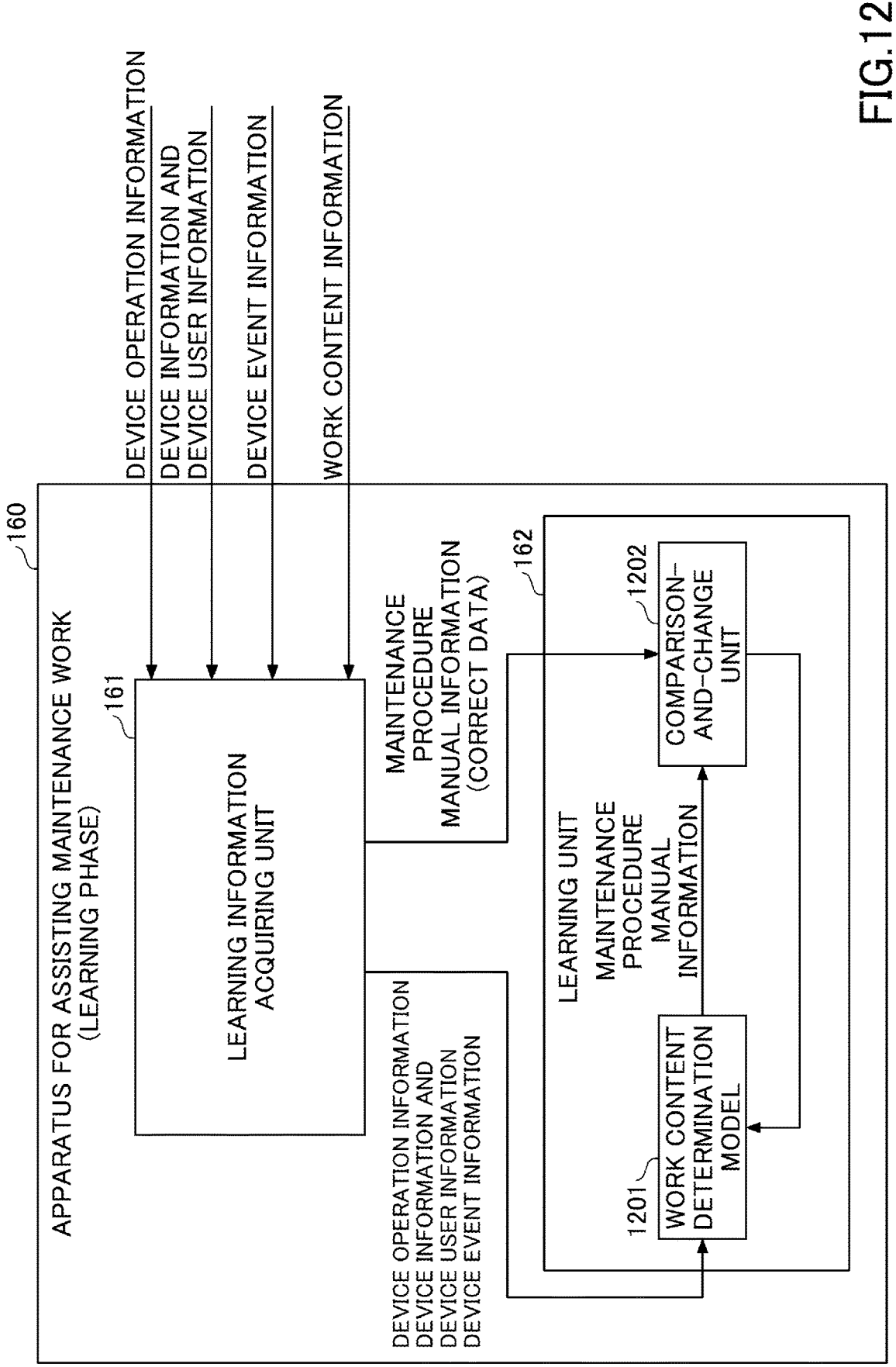
FIG. 12 is a diagram illustrating an example of the function of the apparatus for assisting maintenance work that is implemented in the learning phase according to a second embodiment.

The functional configuration of the apparatus 160 for assisting maintenance work in the learning phase according to the second embodiment will be described. FIG. 12 is a diagram illustrating an example of the function of the apparatus for assisting maintenance work that is implemented in the learning phase according to the second embodiment. The difference from FIG. 8 is that in FIG. 12, the learning unit 162 includes a work content determination model 1201 and a comparison-and-change unit 1202. The learning unit 162 inputs, into the work content determination model 1201, the device operation information, the device event information, the device information, and the device user information, among the indicated learning information, to thereby execute the work content determination model 1201. With this arrangement, the work content determination model 1201 outputs maintenance procedure manual information.

The maintenance procedure manual information output from the work content determination model 1201 is input to the comparison-and-change unit 1202. The comparison-and-change unit 1202 compares maintenance procedure manual information output from the work content determination model 1201, against maintenance procedure manual information (correct data) indicated by the learning information acquiring unit 161.

The comparison-and-change unit 1202 changes model parameters of the work content determination model 1201 in accordance with a result of comparison.

Note that the maintenance procedure manual information indicated by the learning information acquiring unit 161 is information for identifying a maintenance procedure manual, such as "maintenance procedure manual 1". Alternatively, a given workflow (e.g., workflow 500) included in the maintenance procedure manual may be identified.

In such a manner, the learning unit 162 performs machine learning with respect to the work content determination model 1201 for identifying the relationship between:

device operation information, device event information, device information, and device user information (dataset), and maintenance procedure manual information.

With this arrangement, the learning unit 162 generates a trained work content determination model for determining maintenance procedure manual information.

Note that the example of FIG. 12 has been directed to a case in which the learning unit 162 inputs, into the work content determination model 1201, the device operation information, the device event information, the device information, and the device user information. Alternatively, only a portion of the information described above may be inputted into the work content determination model 1201.

For example, the learning unit 162 performs machine learning with respect to the work content determination model 1201 for identifying the relationship between:

device operation information and device information (data set), and maintenance procedure manual information, or with respect to the work content determination model 1201 for identifying the relationship between:

device event information and device information (data set), and maintenance procedure manual information. With this arrangement, the learning unit 162 generates a trained work content determination model 1201 for determining maintenance procedure manual information.

<Details of Functional Configuration of Inference Part>

Figure 13:
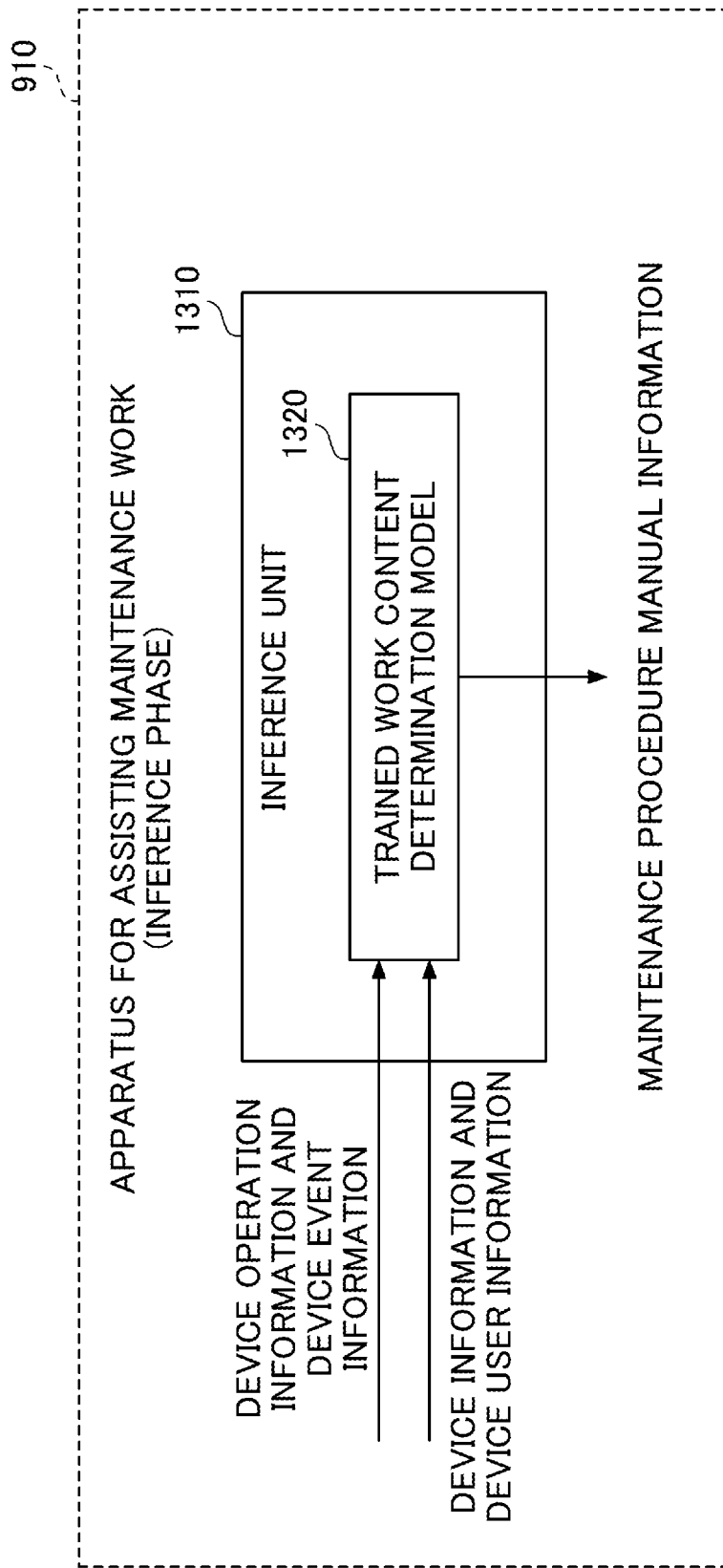
FIG. 13 is a second diagram illustrating the details of the functional configuration of the inference unit.

Hereafter, the functional configuration of the inference unit, among functional configurations of the apparatus 910 for assisting maintenance work in the inference phase, will be described in detail. FIG. 13 is a second diagram illustrating the details of the functional configuration of the inference unit. The difference from FIG. 10 is that in FIG. 13, the inference unit 1310 includes a trained work content determination model 1320.

The inference unit 1310 inputs, into the trained work content determination model 1320, the retrieved device operation information and device event information, and the acquired device information and device user information to thereby execute the trained work content determination model 1320. With this arrangement, the trained work content determination model 1320 infers maintenance procedure manual information.

In the manner described above, the inference unit 1310 infers the maintenance procedure manual information based on present equipment operation information and device event information, as well as the device information and device user information of a target air conditioner to be processed, thereby enabling inferring of appropriate maintenance procedure manual information.

Note that in the above description, the inference unit 1310 inputs, into the trained work content determination model 1320, the device operation information, the device event information, the device information, and the device user information. Alternatively, when the trained work content determination model 1320 has been generated based on the device operation information and the device information, the inference unit 1310 inputs the device operation information and the device information into the trained work content determination model 1320. Also, when the trained work content determination model 1320 has been generated based on the device event information and the device information, the inference unit 1310 inputs the device event information and the device information into the trained work content determination model 1320.

The maintenance procedure manual information inferred by the inference unit 1310 is information for identifying a maintenance procedure manual, or a workflow included in the maintenance procedure manual.

<Flow of Process for Assisting Maintenance Work>

Hereafter, the flow of a process for assisting maintenance work, by the apparatus 160 for assisting maintenance work in the learning phase and the apparatus 910 for assisting maintenance work in the inference phase, will be described.

Figure 14:
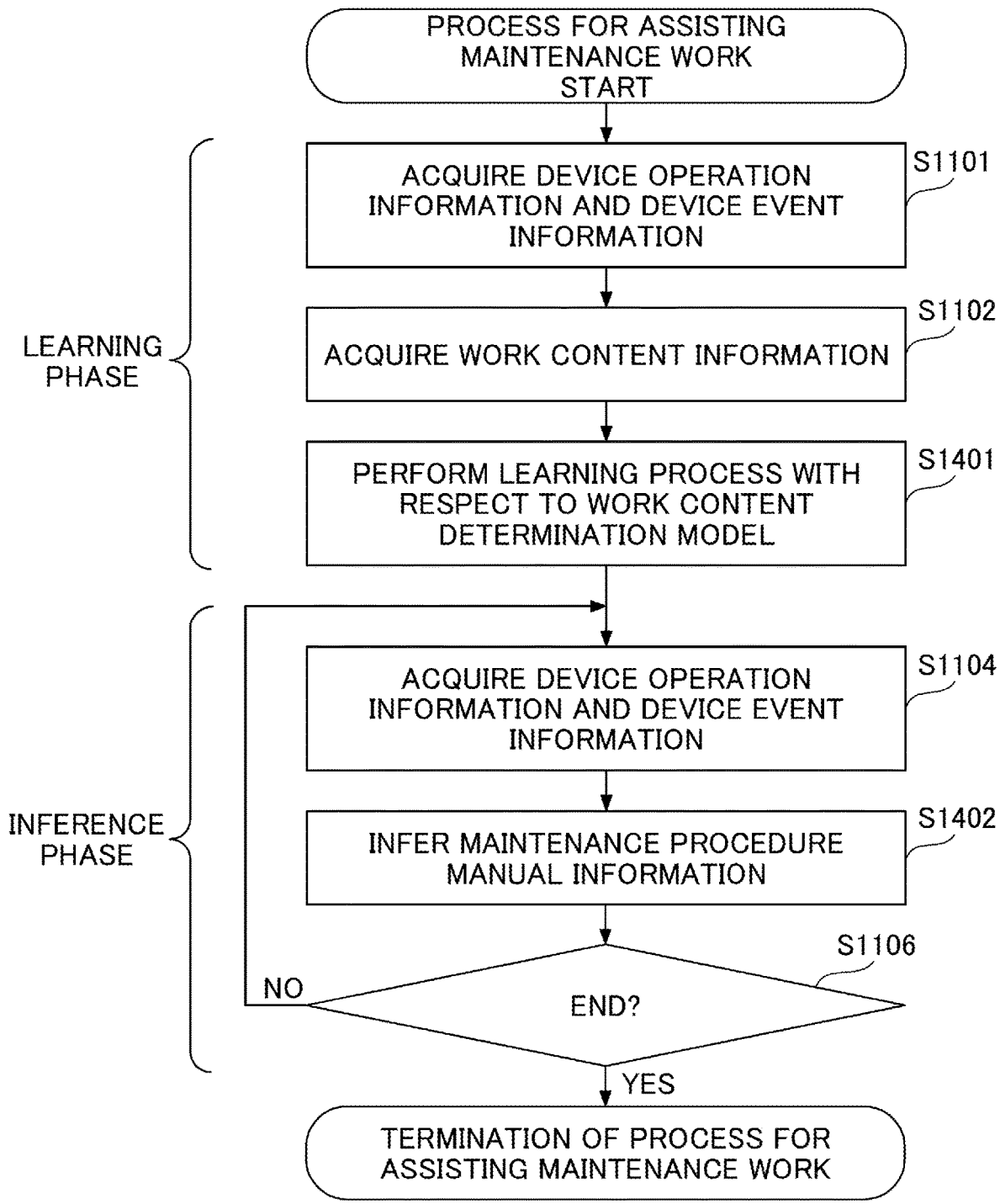
FIG. 14 is a flowchart illustrating the flow of the process of assisting maintenance work by apparatuses for assisting maintenance work according to the second embodiment.

FIG. 14 is a flowchart illustrating the flow of the process for assisting maintenance work by apparatuses for assisting maintenance work according to the second embodiment. The differences from the flowchart illustrated in FIG. 11 are steps S1401 and S1402.

In step S1401, the learning unit 162 inputs, into the work content determination model 1201, the device operation information and the device event information so as to execute the work content determination model 1201. The learning unit 162 performs machine learning with respect to the work content determination model 1201 such that the maintenance procedure manual information output from the work content determination model 1201 approaches the maintenance procedure manual information (correct data) included in the acquired maintenance procedure information. With this arrangement, the learning unit 162 generates a trained work content determination model. Note that the generated trained work content determination model is incorporated into the apparatus 910 for assisting maintenance work in the inference phase.

In step S1402, the inference unit 912 inputs the acquired device operation information and device event information into the trained work content determination model 1320 to execute the trained work content determination model 1320. With this arrangement, the inference unit 912 infers maintenance procedure manual information for identifying a maintenance procedure to be performed by the maintenance operator 150.

[Summary]

As is understood from the description provided above, any one of apparatuses for assisting maintenance work according to the second embodiment is configured to:

perform learning with respect to device operation information and device information (or, device event information and device information) associated with operation procedure information, and infer, based on a result of learning, maintenance procedure manual information, from newly acquired device operation information and device information (or, device event information and device information).

In the manner described above, according to the apparatuses for assisting maintenance work of the second embodiment, the maintenance procedure manual information for identifying a maintenance procedure to be performed by a maintenance operator can be inferred upon occurrence of an anomaly;

According to the second embodiment as described above, the maintenance procedure manual information can be identified prior to on-site services, and necessary preparation for a work procedure can be made prior to the on-site services, thereby enabling reducing of the number of on-site services. In other words, according to the second embodiment, an apparatus for assisting maintenance work, a method of assisting maintenance work, and a program for assisting maintenance work that assists maintenance work, while reducing the number of on-site services by a maintenance operator, can be provided.

Third Embodiment

The first embodiment described above has been directed to a case in which machine learning is performed using correct data when machine learning is performed with respect to the part determination model. In contrast, in a third embodiment, a case in which reinforcement learning is performed with respect to the part determination model will be described. In the following, the third embodiment will be described with a focus on the differences from the first embodiment.

<System Configuration of System for Assisting Maintenance Work (Reinforcement Learning Phase)>

Figure 15:
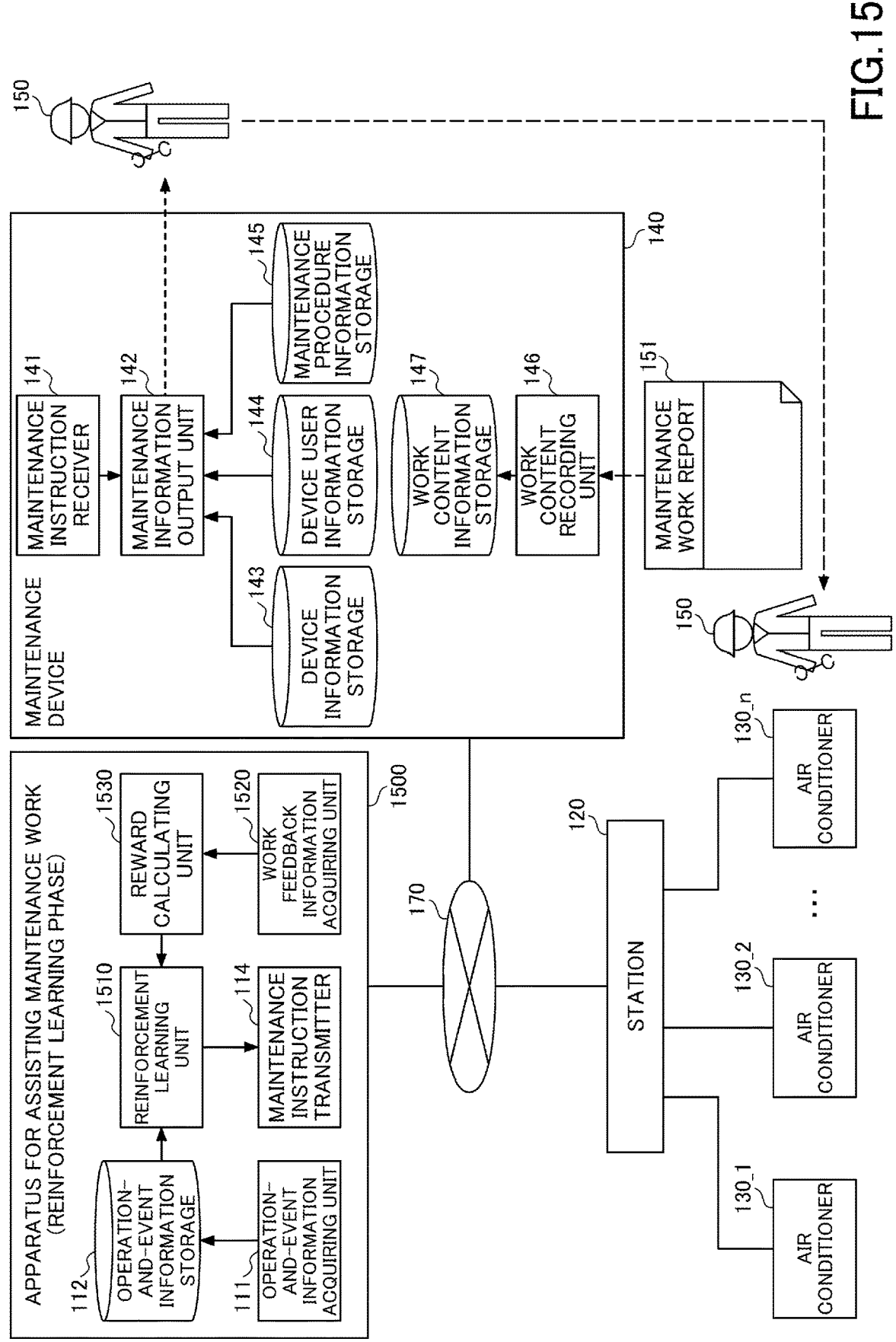
FIG. 15 is a diagram illustrating an example of a system configuration of the system for assisting maintenance work (enhanced learning phase).

The system configuration of the system for assisting maintenance work will be described. FIG. 15 is a diagram illustrating an example of the system configuration of the system for assisting maintenance work (reinforcement learning phase). The difference from FIG. 1 is an apparatus 1500 for assisting maintenance work.

A program for assisting maintenance work is installed in the apparatus 1500 for assisting maintenance work. When the program is executed, the apparatus 1500 for assisting work support serves as the operation-and-event information acquiring unit 111, a reinforcement learning unit 1510, the maintenance instruction transmitter 114, a work feedback information acquiring unit 1520, and a reward calculating unit 1530.

Because the operation-and-event information acquiring unit 111 and the maintenance instruction transmitter 114 have been described with reference to FIG. 1 in the first embodiment, the description thereof will be omitted.

The reinforcement learning unit 1510 retrieves the device operation information and device event information, from the operation-and-event information storage 112, and performs reinforcement learning with respect to a model that determines a part to be replaced or repaired, or a new part after replacement. The reinforcement learning unit 1510 performs reinforcement learning so as to maximize a reward output from the reward calculating unit 1530. Also, the reinforcement learning unit 1510 transmits, to the maintenance instruction transmitter 114, the part information (part code) that is acquired by performing reinforcement learning.

The work feedback information acquiring unit 1520 acquires, from the maintenance device 140, work feedback information for calculating a reward, via the network 170. The work feedback information is information for evaluating a result of maintenance work with respect to a target air conditioner to be processed. The work feedback information acquiring unit 1520 indicates the acquired work feedback information to the reward calculating unit 1530.

The reward calculating unit 1530 is an example of a calculation unit, and calculates, based on the work feedback information, a reward to be used when the reinforcement learning unit 1510 performs reinforcement learning.

<Details of Functional Configuration of Reinforcement Learning Unit>

Figure 16:
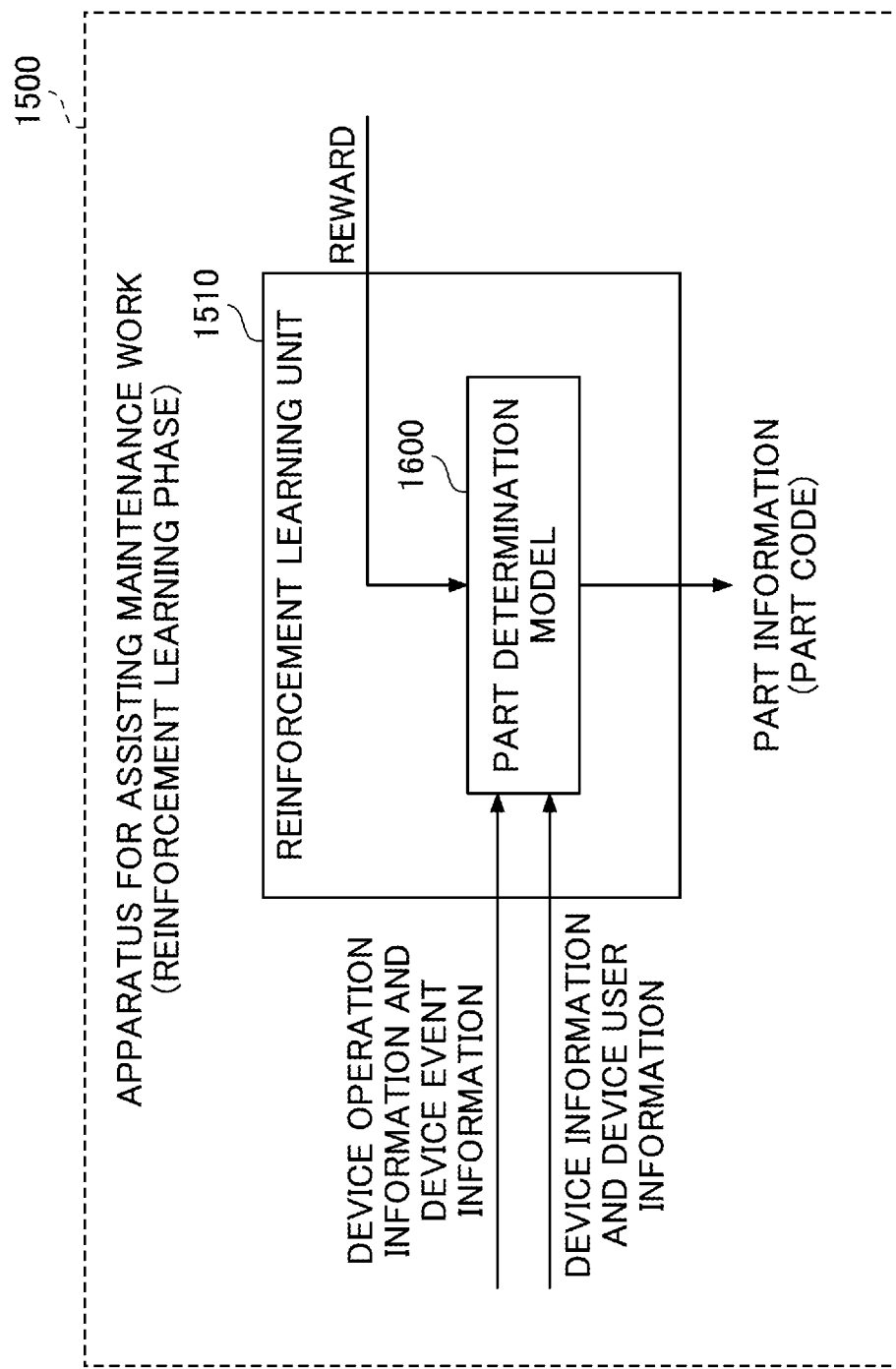
FIG. 16 is a diagram illustrating the details of the functional configuration of a reinforcement learning unit.

Hereafter, the functional configuration of the reinforcement learning unit 1510 will be described in detail. FIG. 16 is a diagram illustrating the details of the functional configuration of the reinforcement learning unit.

As illustrated in FIG. 16, the reinforcement learning unit 1510 includes a part determination model 1600. The reinforcement learning unit 1510 changes model parameters of the part determination model 1600 so as to maximize a reward that is calculated by the reward calculating unit 1530. The reinforcement learning unit 1510 inputs, into the part determination model 1600 whose model parameters have been changed, the device operation information and device event information that are retrieved from the operation-and-event information storage 112, as well as the device information and device user information, thereby causing the part determination model 1600 to be executed. With this arrangement, the part determination model 1600 outputs part information.

In the manner described above, the reinforcement learning unit 1510 performs reinforcement learning with respect to the part determination model 1600 so as to maximize the reward calculated based on work feedback information set when maintenance work has been performed based on previous part information. Accordingly, the reinforcement learning unit 1510 can output appropriate part information.

<Reinforcement Learning Process>

Figure 17:
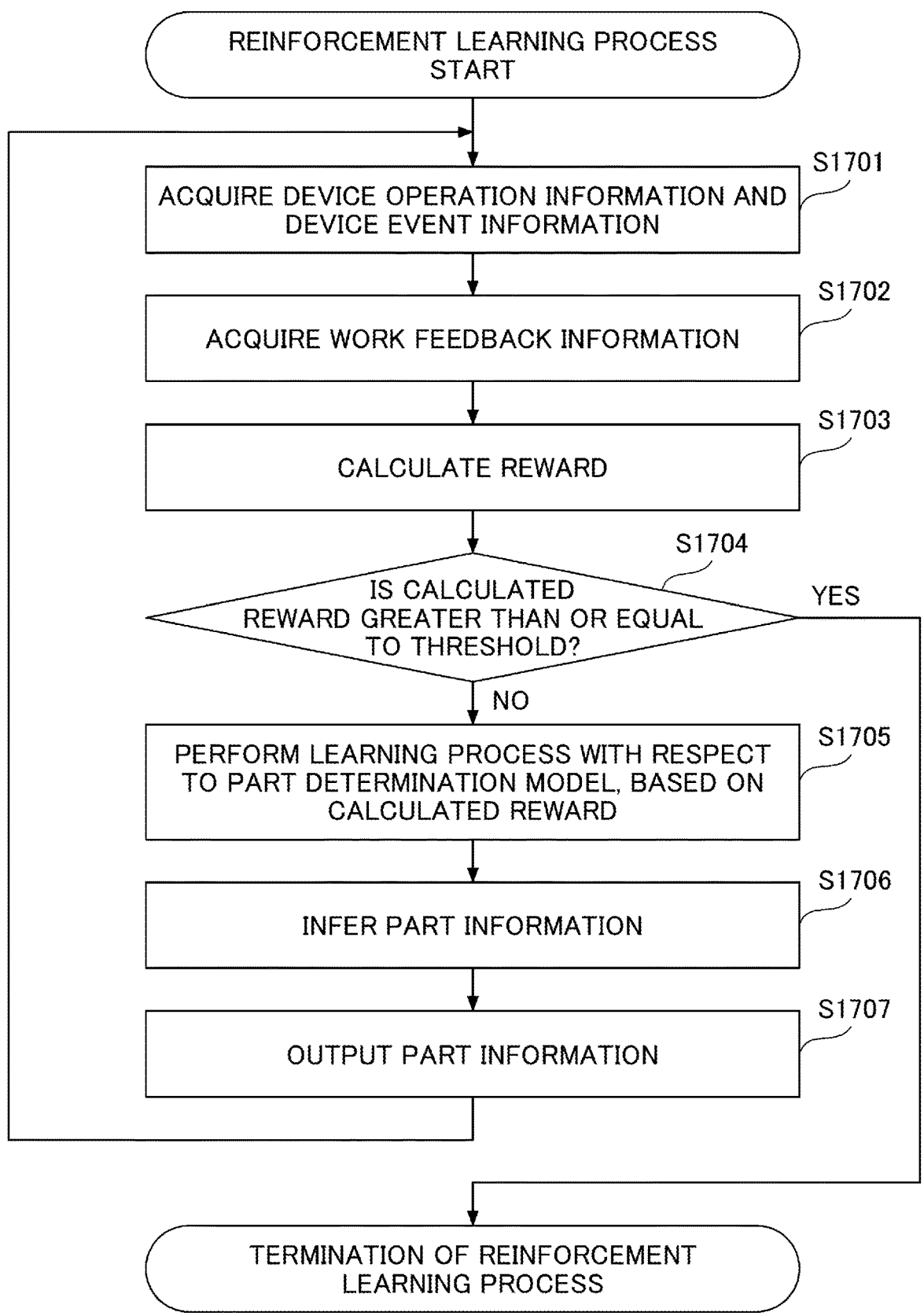
FIG. 17 is a flowchart illustrating the flow of a reinforcement learning process by the apparatus for assisting maintenance work according to a third embodiment.

Hereafter, the flow of an enhanced learning process by the apparatus 1500 for assisting maintenance work according to the third embodiment will be described. FIG. 17 is a flowchart illustrating the flow of the enhanced learning process by the apparatus for assisting maintenance work according to the third embodiment.

In step S1701, the reinforcement learning unit 1510 acquires the device operation information and the device event information.

In step S1702, the work feedback information acquiring unit 1520 acquires the work feedback information.

In step S1703, the reward calculating unit 1530 calculates a reward based on the work feedback information.

In step S1704, the reward calculating unit 1530 determines whether the calculated reward is greater than or equal to a predetermined threshold. If it is determined in step S1704 that the calculated reward is less than a predetermined threshold (NO in step S1704), the process proceeds to step S1705.

In step S1705, the reinforcement learning unit 1510 performs machine learning with respect to the part determination model 1600 so as to maximize the calculated reward.

In step S1706, the reinforcement learning unit 1510 inputs the acquired device operation information and the device event information into the part determination model 1600 so as to execute the part determination model 1600. With this arrangement, the reinforcement learning unit 1510 outputs component information.

In step S1701, the maintenance instruction transmitter 114 transmits the part information to the maintenance device 140, and then the process returns to step S1701.

In contrast, if it is determined in step S1704 that the calculated reward is greater than or equal to a predetermined threshold (YES in step S1704), the reinforcement learning process is terminated.

[Summary]

As is understood from the description provided above, the apparatus for assisting maintenance work according to the third embodiment is configured to:

calculate a reward with respect to part information, based on work feedback information, and input device operation information and device event information to execute a part determination model for which reinforcement learning has been performed, thereby outputting part information (part code).

With this arrangement, according to the apparatus for assisting maintenance work of the third embodiment, upon occurrence of an anomaly, the part information (part code) for indicating a part to be replaced or repaired, or a new part after replacement can be output.

In the manner described above, according to the third embodiment, the maintenance operator can identify the part information (part code) prior to on-site services and make necessary preparation for replacement or repair, prior to the on-site services, thereby reducing the number of on-site services. In other words, according to the third embodiment, an apparatus for assisting maintenance work, a method of assisting maintenance work, and a program for assisting maintenance work that assists maintenance work, while reducing the number of on-site services by a maintenance operator, can be provided.

Other Embodiments

The second embodiment has been directed to a case in which machine learning is performed using correct data when machine learning is performed with respect to the work content determination model. Alternatively, a learning process method is not limited to the manner described above, and the work content determination model may be configured to perform machine learning through reinforcement learning, as in the third embodiment.

The description of the embodiments provided above makes no mention of the details of the models used in machine learning (i.e., the part determination model and the work content model). In this regard, any types of model may be utilized as the model used in machine learning. Specifically, any types of model, such as an NN (neural network) model, a random forest model, or an SVM (support vector machine) model, may be utilized.

The description of the first and second embodiments provided above makes no mention of the details of how to change model parameters when needed based on the result of comparison by the comparison-and-change unit. The method of changing model parameters performed by the comparison-and-change unit should depend on the types of model.

The description of the third embodiment provided heretofore makes no mention of the details of how the reward calculating unit calculates rewards. The reward calculating unit may calculate rewards by use of any method.

Although the description has been given of the embodiments, it may be understood that various modifications may be made to the configurations and details thereof, without departing from the spirit and scope of claims.

This application is based on and claims priority to Japanese Patent Application No. 2019-052019 filed on Mar. 19, 2019, and the entire contents of this Japanese Patent Application are incorporated herein by reference.

DESCRIPTION OF SYMBOLS

100: system for assisting maintenance work
110: monitoring device
120: station
130_1 to 130_n: air conditioner
140: maintenance device
160: apparatus for assisting maintenance work
161: learning information acquiring unit
162: learning unit
200: device operation information
210: device event information
400: device information
410: device user information
420: maintenance procedure information
600: work content information
801: part determination model
802: comparison-and-change unit
910: apparatus for assisting maintenance work
911: device-related information acquiring unit
912: inference unit
1000: trained part determination model
1201: work content determination model
1202: comparison-and-change unit
1310: inference unit
1320: trained work content determination model
1500: apparatus for assisting maintenance work
1510: reinforcement learning unit
1520: work feedback information acquiring unit
1530: reward calculating unit
1600: part determination model

The invention claimed is:

1. An apparatus for assisting maintenance work comprising:
hardware configured to:
acquire a data set including a combination of device information of a target device and operation information of the target device, or a data set including a combination of the device information of the target device and event information indicating an event for the target device;
acquire work content information indicating a content of maintenance work, for the target device, performed through a maintenance operator, the work content information indicating a replaced or repaired part, or a new part after replacement; and
perform learning based on the acquired data set, the data set being associated with the replaced or repaired part, or the new part after replacement that is indicated by the acquired work content information, wherein the learning includes:
processing an input of the data set or a portion of the data set, in accordance with model parameters of a machine learning model;
determining work content information applied to the input; and
updating the model parameters of the machine learning model based on the determined work content information,
wherein the hardware is configured to:
newly acquire a data set including a combination of device information of the target device and operation information of the target device, or a data set including a combination of the device information of the target device and event information indicating an event for the target device, and
infer, based on a result of the learning, a part to be replaced or repaired, or a new part after replacement, with respect to the target device, from the newly acquired data set,
wherein the work content information includes an anomaly location and a confidence level associated with the anomaly location, and
wherein the hardware is configured to perform the learning upon occurrence of a condition in which the confidence level in the work content information is higher than a threshold.

2. The apparatus for assisting maintenance work according to claim 1, wherein the device information includes a type of the target device.

3. The apparatus for assisting maintenance work according to claim 1, wherein, the operation information includes any one among an anomaly code, anomaly prediction data, an operation condition, room temperature, outside temperature, and a total operating time length, and each of the anomaly code and the anomaly prediction data is output from the target device.

4. The apparatus for assisting maintenance work according to claim 3, wherein the target device is an air conditioner, and the operation condition includes any one among a compressor speed, an inlet superheating level, a supercooling level, a discharging temperature, a value indicating high or low pressure, high pressure-side temperature, a low pressure-side temperature, valve opening, and a temperature of an external heat exchanger.

5. The apparatus for assisting maintenance work according to claim 1, wherein the event information includes information indicating an event that occurs depending on a fault or an anomaly of the target device.

6. An apparatus for assisting maintenance work comprising:
   hardware configured to:
      acquire a data set including a combination of device information of a target device and operation information of the target device, or a data set including a combination of the device information of the target device and event information indicating an event for the target device;
      acquire work content information indicating a content of maintenance work, for the target device, performed through a maintenance operator, the work content information indicating a work procedure; and
      perform learning based on the acquired data set, the data set being associated with the work procedure indicated by the acquired work content information, wherein the learning includes:
         processing an input of the data set or a portion of the data set, in accordance with model parameters of a machine learning model;
         determining work content information applied to the input; and
         updating the model parameters of the machine learning model based on the determined work content information,
   wherein the hardware is configured to:
      newly acquire a data set including a combination of device information of the target device and operation information of the target device, or a data set including a combination of the device information of the target device and event information indicating an event for the target device, and
      infer, based on a result of the learning, a work procedure of the maintenance work for the target device, from the newly acquired data set, and
   wherein the work procedure of the maintenance work includes an order of multiple different work that are to be performed to address the event relating to the event information.

7. The apparatus for assisting maintenance work according to claim 6, wherein the device information includes a type of the target device.

8. The apparatus for assisting maintenance work according to claim 6, wherein the operation information includes any one among an anomaly code, anomaly prediction data, an operation condition, room temperature, outside temperature, and a total operating time length, and each of the anomaly code and the anomaly prediction data is output from the target device.

9. The apparatus for assisting maintenance work according to claim 6, wherein the event information includes information indicating an event that occurs depending on a fault or an anomaly of the target device.

10. An apparatus for assisting maintenance work comprising:
    hardware configured to:
       calculate a reward based on feedback information for evaluating a work result of maintenance work for a target device; and
       learn, with respect to the target device, a part to be replaced or repaired, or a new part after replacement, based on a data set including a combination of device information of the target device and operation information of the target device, or a data set including a combination of the device information of the target device and event information indicating an event for the target device, wherein the learning includes:
          processing an input of the reward and the data set, in accordance with model parameters of a learning model;
          determining a part, or a new part, applied to the input; and
          updating the model parameters of the learning model based on the determined part or new part,
    wherein the hardware is configured to:
       newly acquire a data set including a combination of device information of the target device and operation information of the target device, or a data set including a combination of the device information of the target device and event information indicating an event for the target device, and
       infer, based on a result of the learning, a part to be replaced or repaired, or a new part after replacement, with respect to the target device, from the newly acquired data set, and
    wherein the hardware is configured to acquire the feedback information to change the model parameters of the learning model such that a calculated reward is maximized.

11. The apparatus for assisting maintenance work according to claim 10, wherein the device information includes a type of the target device.

12. The apparatus for assisting maintenance work according to claim 10, wherein the operation information includes any one among an anomaly code, anomaly prediction data, an operation condition, room temperature, outside temperature, and a total operating time length, and each of the anomaly code and the anomaly prediction data is output from the target device.

13. The apparatus for assisting maintenance work according to claim 10, wherein the event information includes information indicating an event that occurs depending on a fault or an anomaly of the target device.

14. An apparatus for assisting maintenance work comprising:
    hardware configured to:
       calculate a reward based on feedback information for evaluating a work result of maintenance work for a target device; and
       learn a work procedure of the maintenance work for the target device, based on a data set including a combination of device information of the target device and operation information of the target device, or a data set including a combination of the device information of the target device and event information indicating an event for the target device, wherein the learning includes:
          processing an input of the reward and the data set, in accordance with model parameters of a learning model;
          determining a work procedure applied to the input; and
          updating the model parameters of the learning model based on the determined work procedure, wherein the hardware is configured to:
newly acquire a data set including a combination of device information of the target device and operation information of the target device, or a data set including a combination of the device information of the target device and event information indicating an event for the target device, and
infer, based on a result of the learning, a work procedure of the maintenance work for the target device, from the newly acquired data set, and
wherein the work procedure of the maintenance work includes an order of multiple different work that are to be performed to address the event relating to the event information.

15. The apparatus for assisting maintenance work according to claim 14, wherein the device information includes a type of the target device.

16. The apparatus for assisting maintenance work according to claim 14, wherein the operation information includes any one among an anomaly code, anomaly prediction data, an operation condition, room temperature, outside temperature, and a total operating time length, and each of the anomaly code and the anomaly prediction data is output from the target device.

17. The apparatus for assisting maintenance work according to claim 14, wherein the event information includes information indicating an event that occurs depending on a fault or an anomaly of the target device.

* * * * *